US010935680B2

(12) United States Patent
Tsingas et al.

(10) Patent No.: US 10,935,680 B2
(45) Date of Patent: Mar. 2, 2021

(54) GENERATING GEOPHYSICAL IMAGES USING DIRECTIONAL ORIENTED WAVEFIELD IMAGING

(71) Applicant: Saudi Arabian Oil Company, Dhahran (SA)

(72) Inventors: Constantinos Tsingas, Dhahran (SA); Young Seo Kim, Abqaiq (SA); Woodon Jeong, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 584 days.

(21) Appl. No.: 15/439,463

(22) Filed: Feb. 22, 2017

(65) Prior Publication Data

US 2018/0239041 A1    Aug. 23, 2018

(51) Int. Cl.
*G01V 1/34* (2006.01)
*G01V 1/28* (2006.01)

(52) U.S. Cl.
CPC .............. *G01V 1/282* (2013.01); *G01V 1/34* (2013.01); *G01V 2210/675* (2013.01); *G01V 2210/74* (2013.01)

(58) Field of Classification Search
CPC . G01V 1/282; G01V 1/34; G01V 1/30; G01V 1/32; G01V 1/28; G01V 2210/675; G01V 2210/74
See application file for complete search history.

(56) References Cited

U.S. PATENT DOCUMENTS 6,988,038 B2 * 1/2006 Trappe ............... G01V 1/32
702/17
8,619,498 B2   12/2013 Xu et al.
(Continued)

FOREIGN PATENT DOCUMENTS

GB    2483997    3/2012

OTHER PUBLICATIONS

Berthold et al., "Determining Optical Flow," Artificial Intelligence, published in 1981, 19 pages.
Hu et al., "Angle Gathers from Reverse Time Migration using Analytic Wavefield Propagation and Decomposition in the Time Domain," Geophysics, vol. 81, No. 1, Jan.-Feb. 2016, pp. S1-S9.
(Continued)

*Primary Examiner* — Gregory J Toatley, Jr.
*Assistant Examiner* — Lynda Dinh
(74) *Attorney, Agent, or Firm* — Fish & Richardson P.C.

(57) ABSTRACT

The present disclosure describes methods and systems, including computer-implemented methods, computer program products, and computer systems, for generating geophysical images. One computer-implemented method includes receiving a set of seismic data associated with a subsurface region; generating source analytic wavefields and receiver analytic wavefields based on the set of seismic data; decomposing the source analytic wavefields and receiver analytic wavefields; computing directions of propagations for the source analytic wavefields and receiver analytic wavefields; computing, for a plurality of subsurface points, an azimuth angle and a reflection angle for a respective subsurface point based on the directions of propagations; generating for each of the plurality of subsurface points, a weighting function for a respective subsurface point based on the azimuth angle and the reflection angle of the respective subsurface point; and generating a subsurface image using the weighting functions of the plurality of subsurface points.

14 Claims, 23 Drawing Sheets

(19 of 23 Drawing Sheet(s) Filed in Color)

(56) References Cited

U.S. PATENT DOCUMENTS

| | | | |
|---|---|---|---|
| 2012/0026833 A1 | 2/2012 | Soubaras et al. | |
| 2012/0039149 A1* | 2/2012 | Van Borselen | G01V 1/362 367/24 |
| 2012/0075954 A1* | 3/2012 | Xu | G01V 1/36 367/38 |
| 2014/0293744 A1 | 10/2014 | Zhang | |
| 2015/0030210 A1* | 1/2015 | Matson | G01V 1/362 382/109 |
| 2016/0266266 A1* | 9/2016 | Hu | G01V 1/28 |
| 2017/0031042 A1* | 2/2017 | Swan | G01V 1/28 |
| 2017/0108603 A1* | 4/2017 | Jilek | G01V 1/362 |

OTHER PUBLICATIONS

Liu et al., "An Effective Imaging Condition for Reverse-Time Migration using Wavefield Decomposition," Geophysics, vol. 76, No. 1, Jan.-Feb. 2011, pp. S29-S39.

Xu et al., "3D Angle Gathers from Reverse Time Migration," Geophysics, vol. 76, No. 2, Mar.-Apr. 2011, pp. S77-S92.

Zhang et al., "Amplitude-Preserving Reverse Time Migration: From Reflectivity to Velocity and Impedance Inversion," Geophysics, vol. 79, No. 6, Nov.-Dec. 2014, pp. S271-S283.

Zhang, "RTM Angle Gathers and Specular Filter (SF) RTM using Optical Flow," SEG Denver 2014 Annual Meeting, published in 2014, 5 pages.

Jiangtao hu et al., "Angle gathers from reverse time migration using analytic wavefield propagation and decomposition in the time domain," XP055466906, Geophysics vol. 81, No. 1, Jan. 1, 2016, 9 pages.

International Search Report and Written Opinion issued in International Application No. PCT/US2018/017209 dated Apr. 23, 2018, 15 pages.

Gulf Cooperation Council Examination Report issued in GCC Application No. 2018-34786 dated Jul. 22, 2019, 4 pages.

GCC Examination Report in GCC Application No. 2018-34786, dated Aug. 27, 2020, 3 pages.

\* cited by examiner

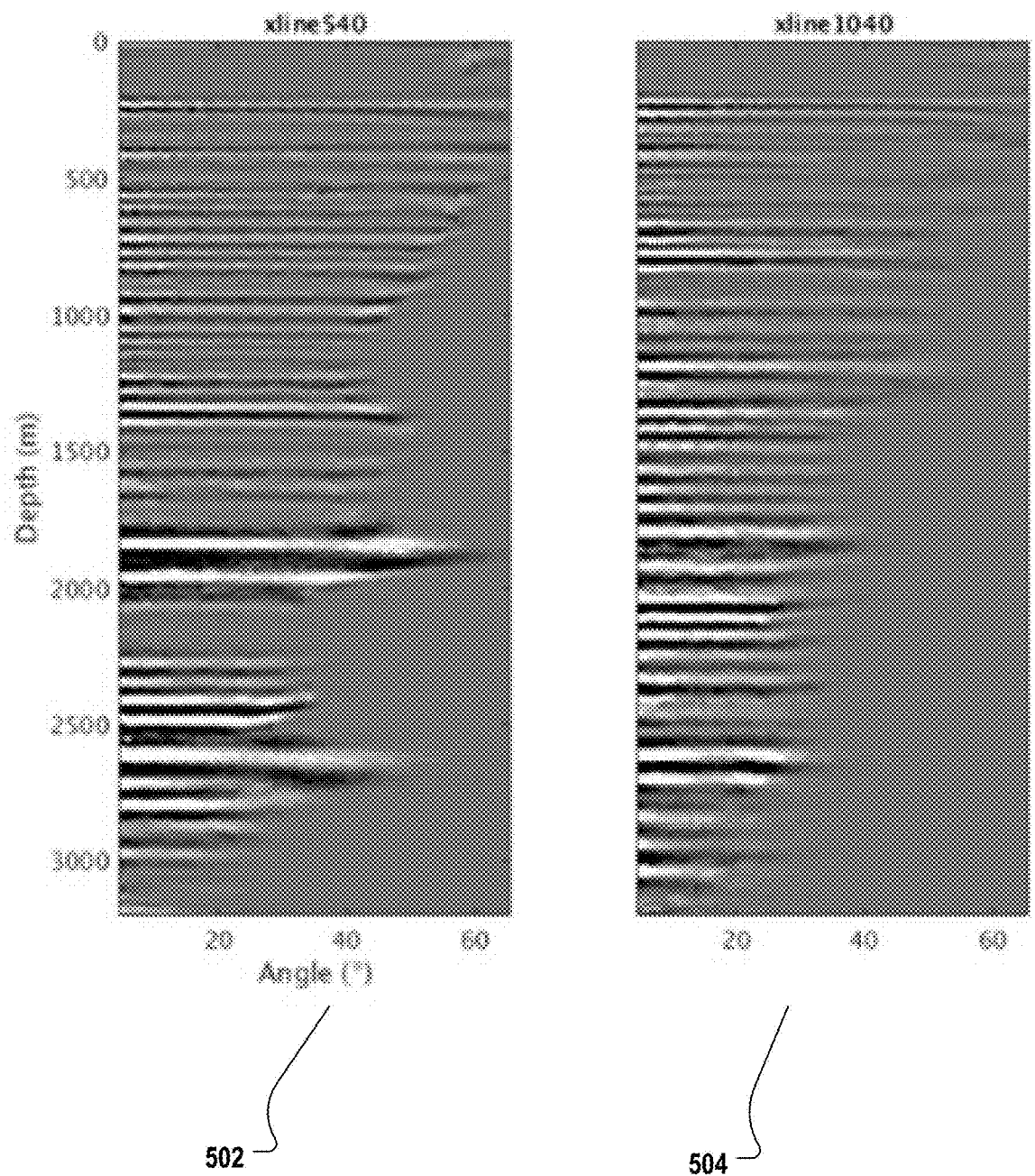
FIG. 5A1

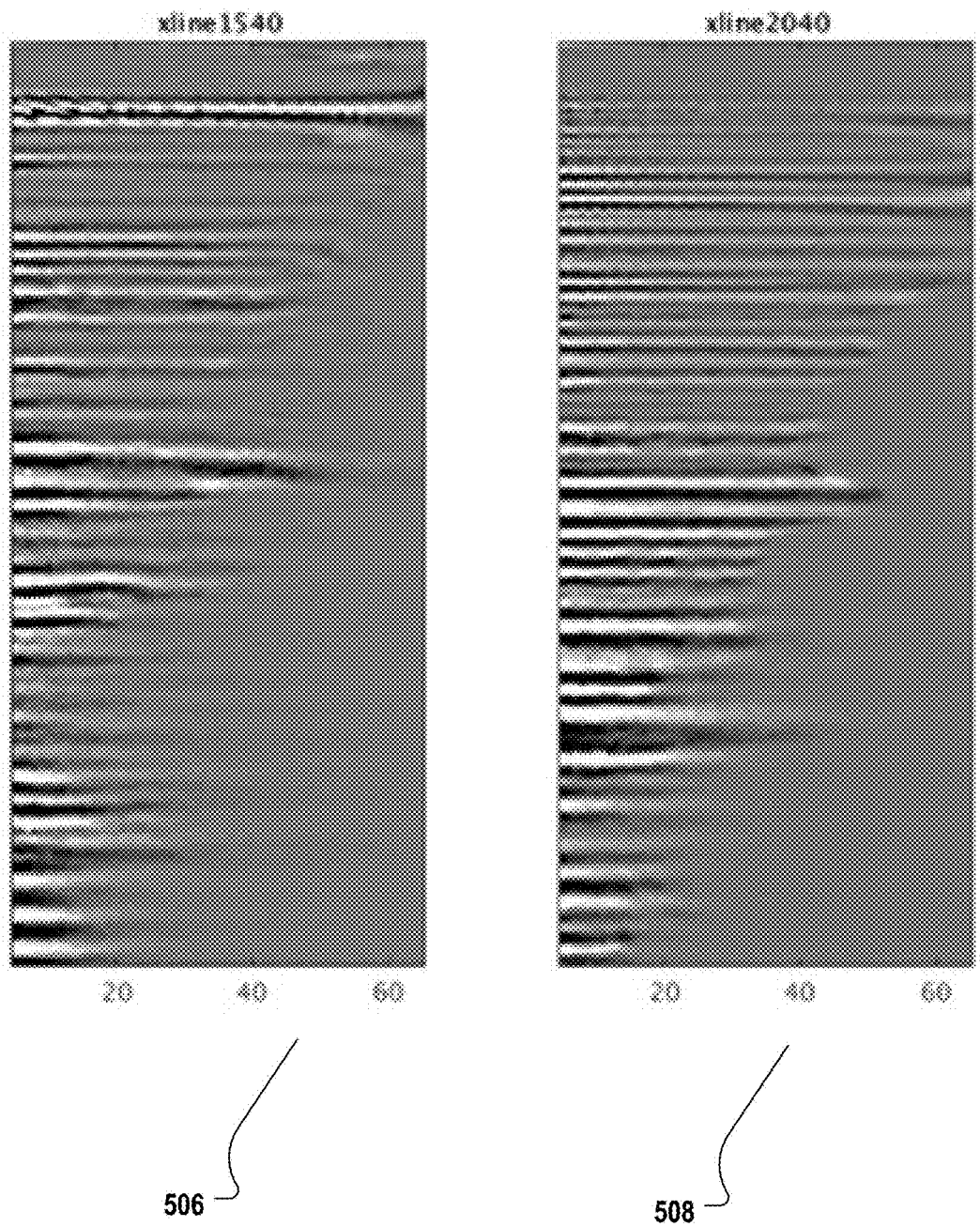
FIG. 5A2

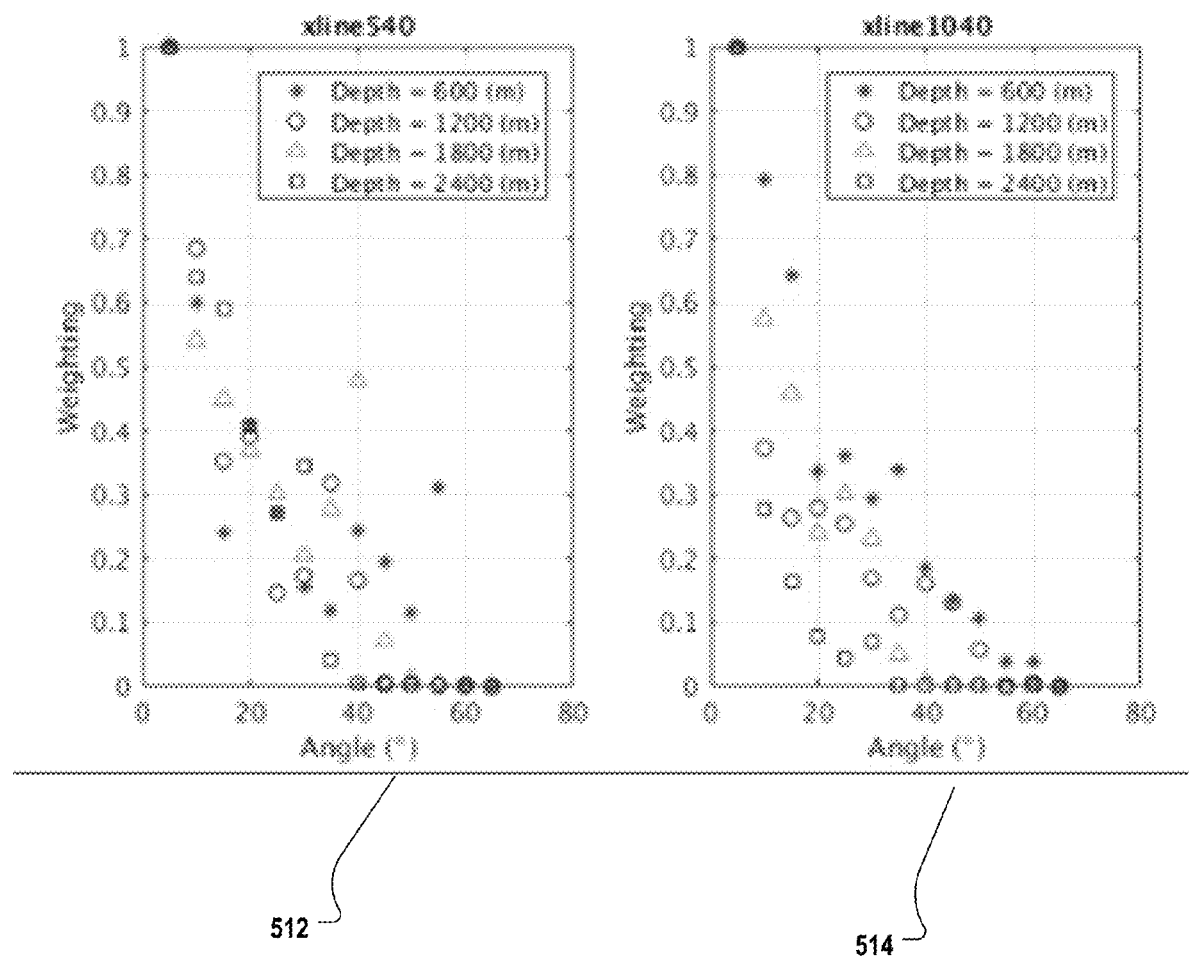
FIG. 5B1

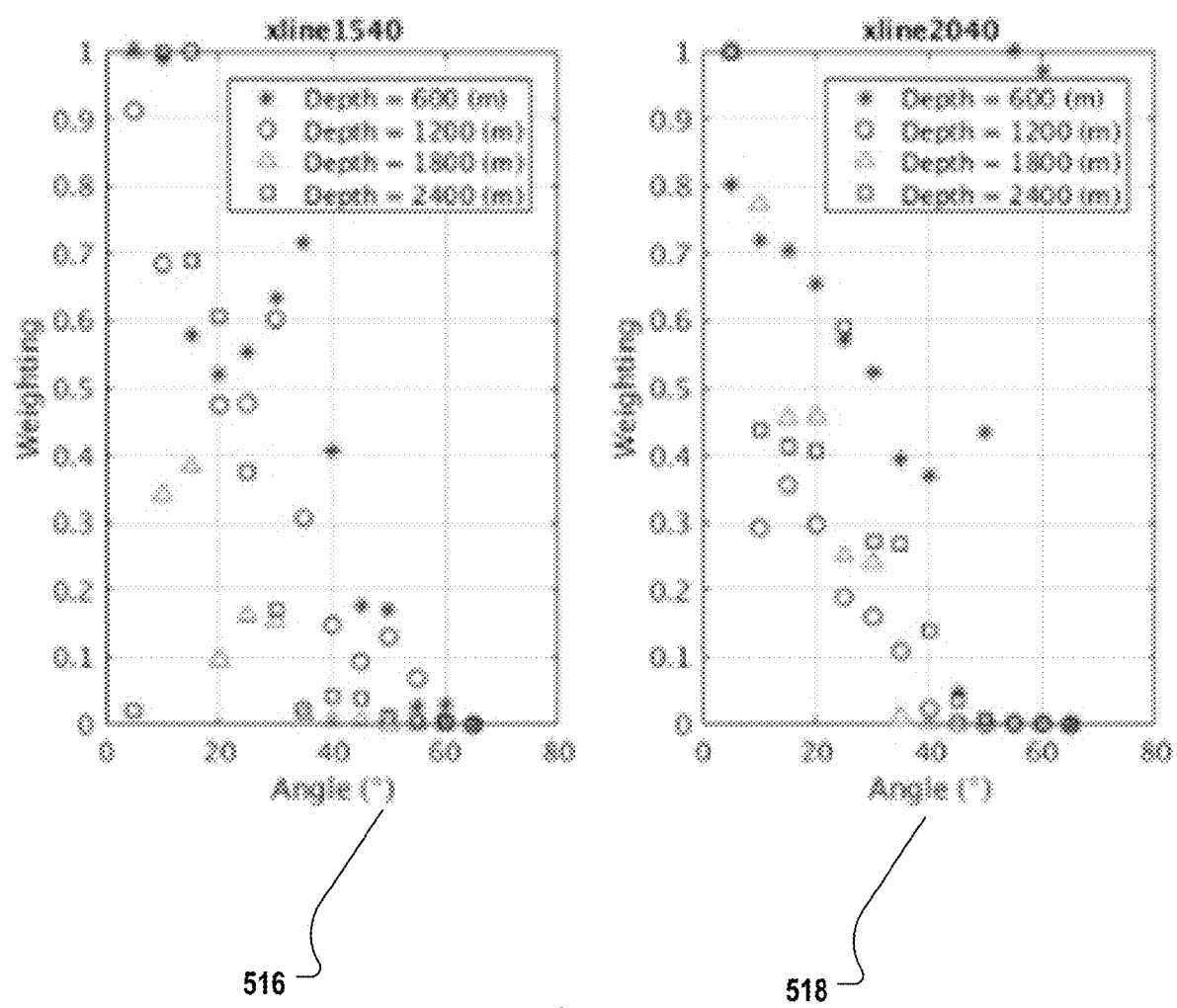
FIG. 5B2

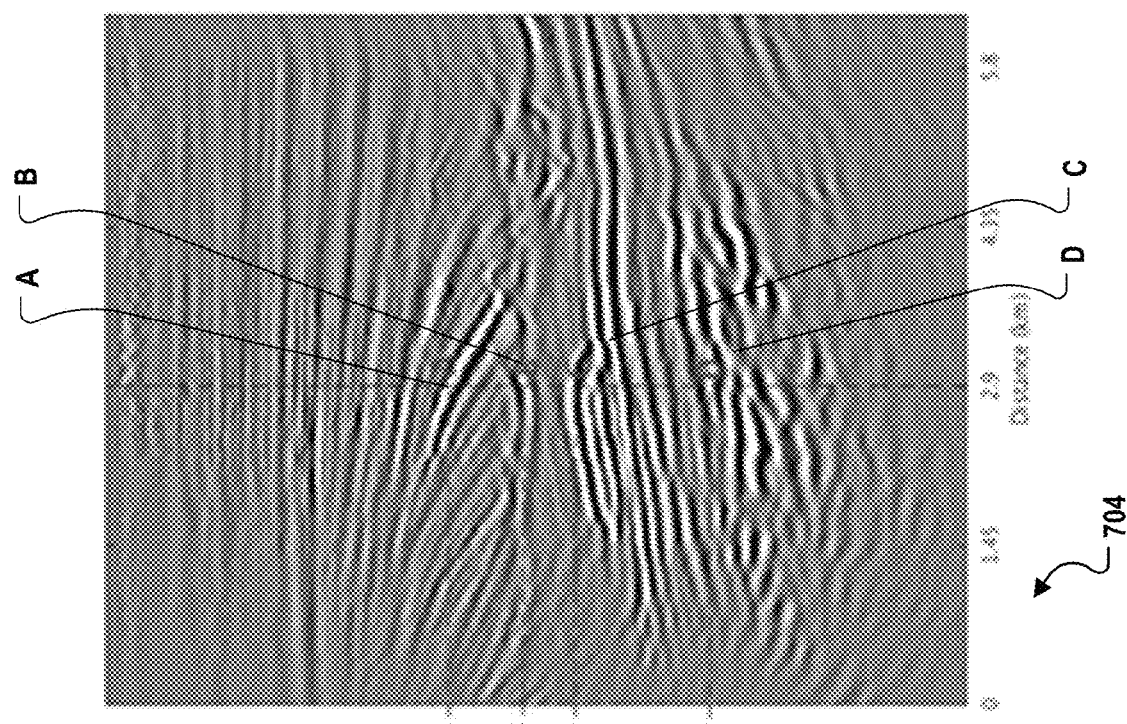
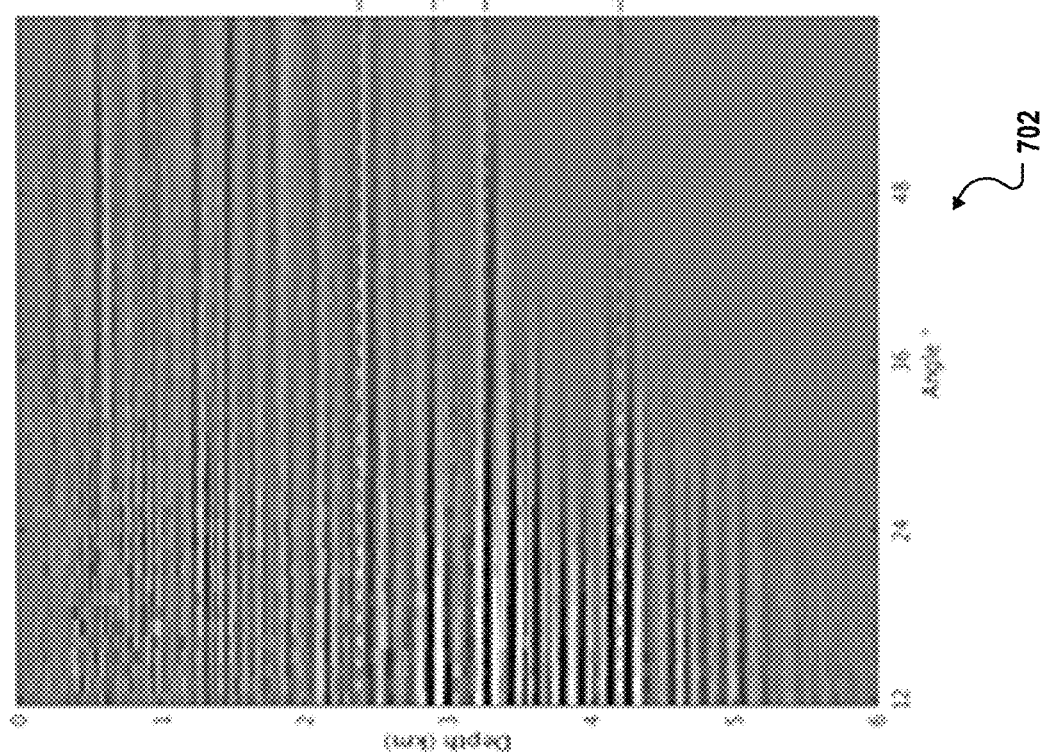
FIG. 7

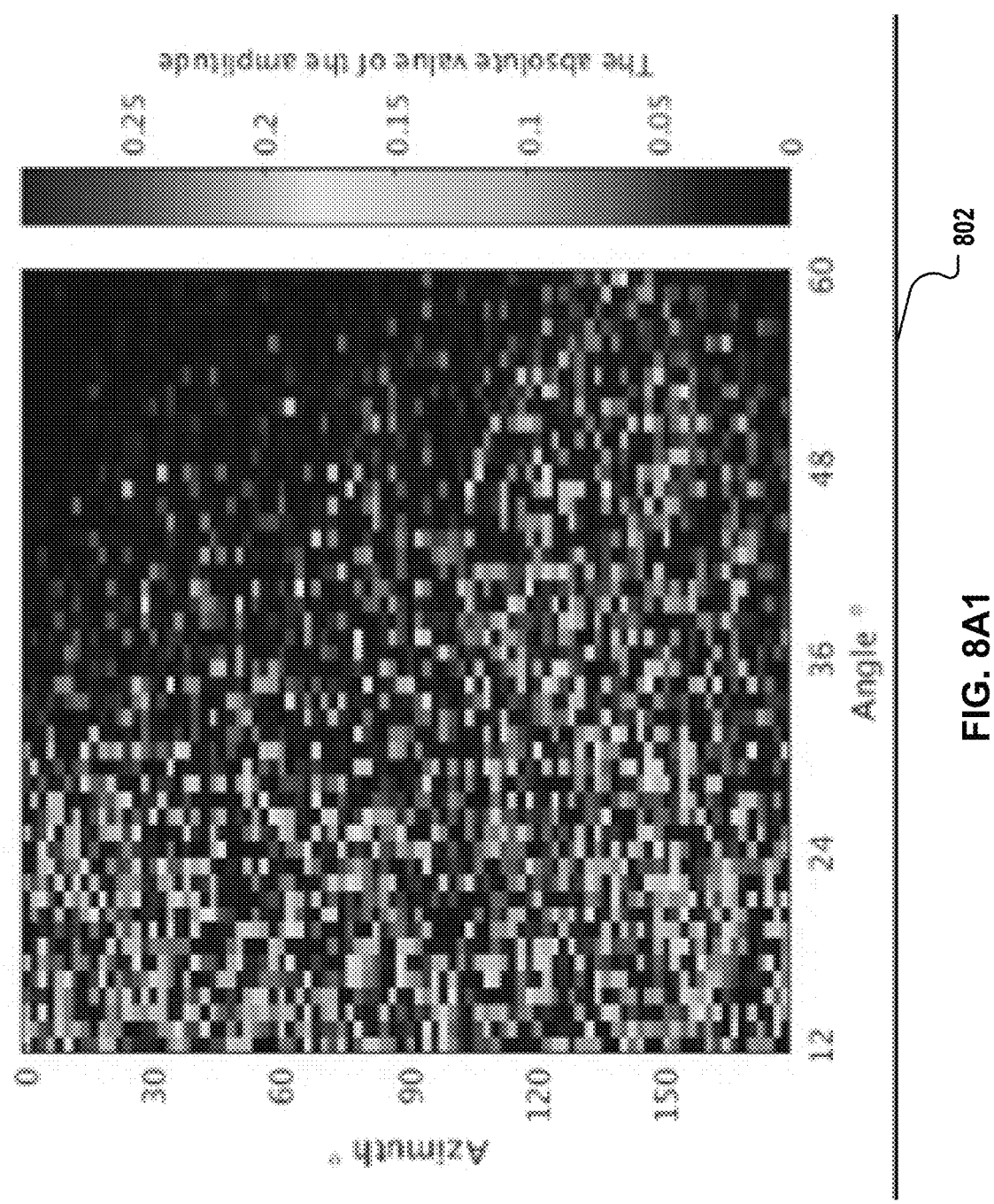
FIG. 8A1

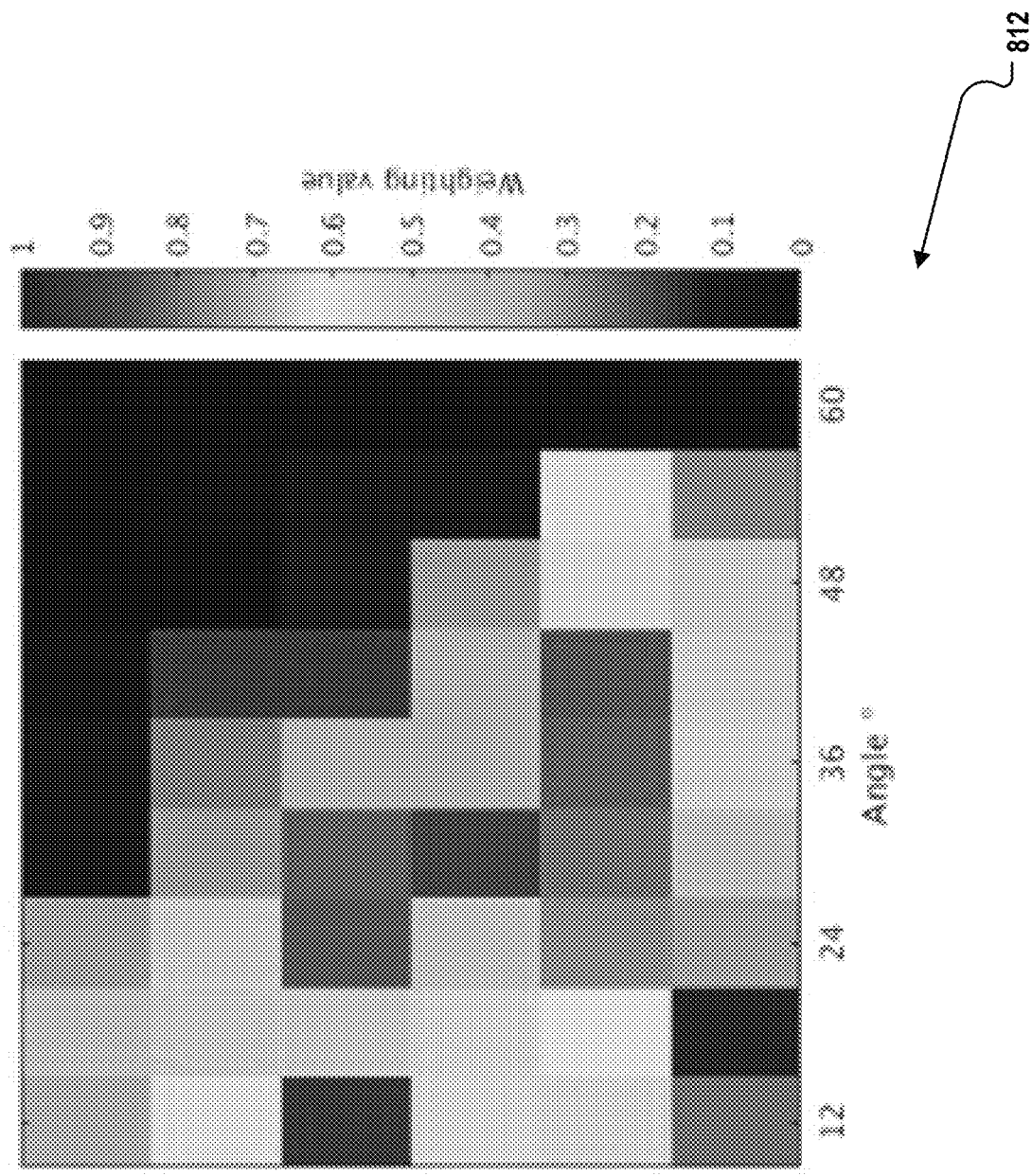
FIG. 8A2

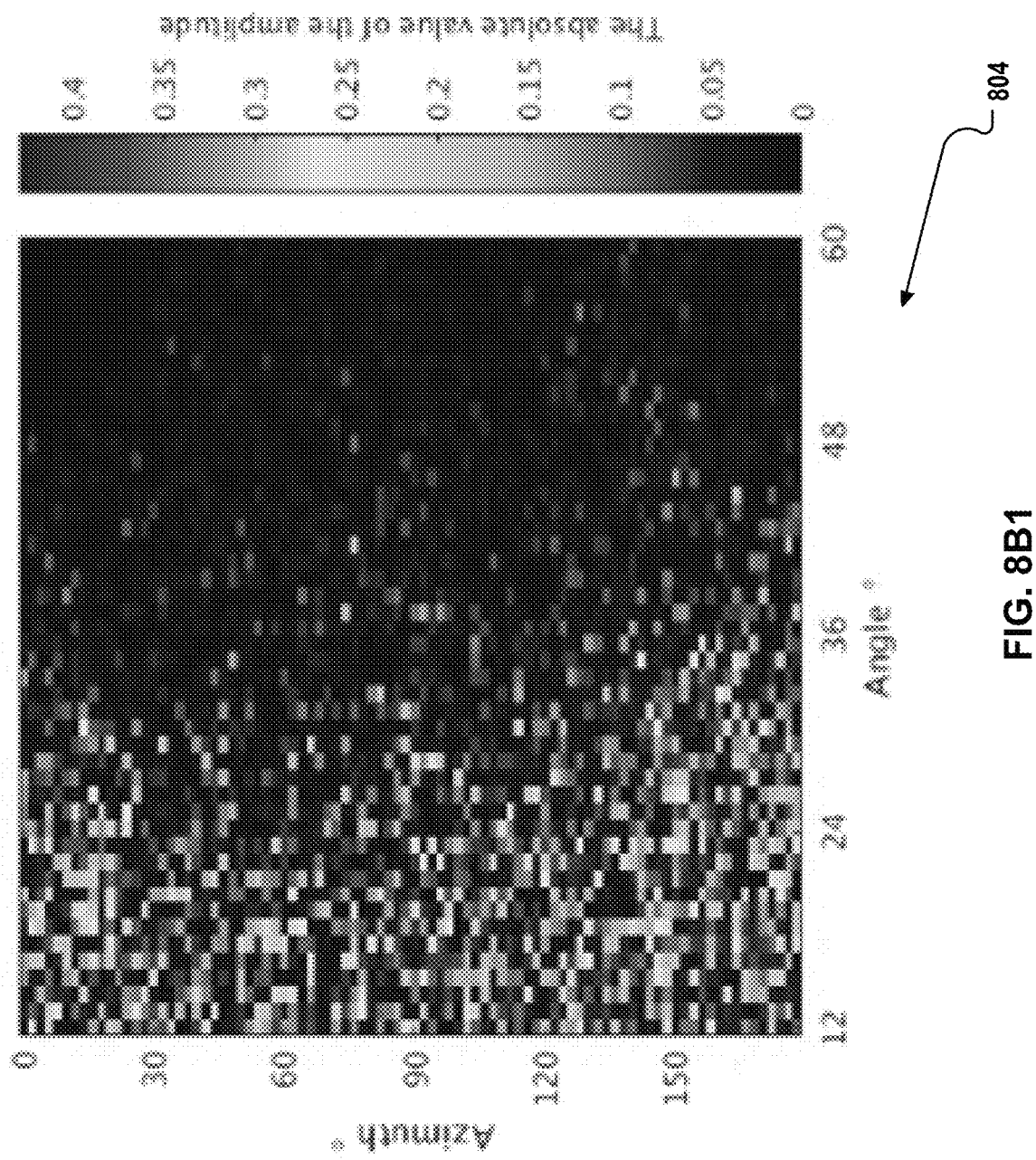
FIG. 8B1

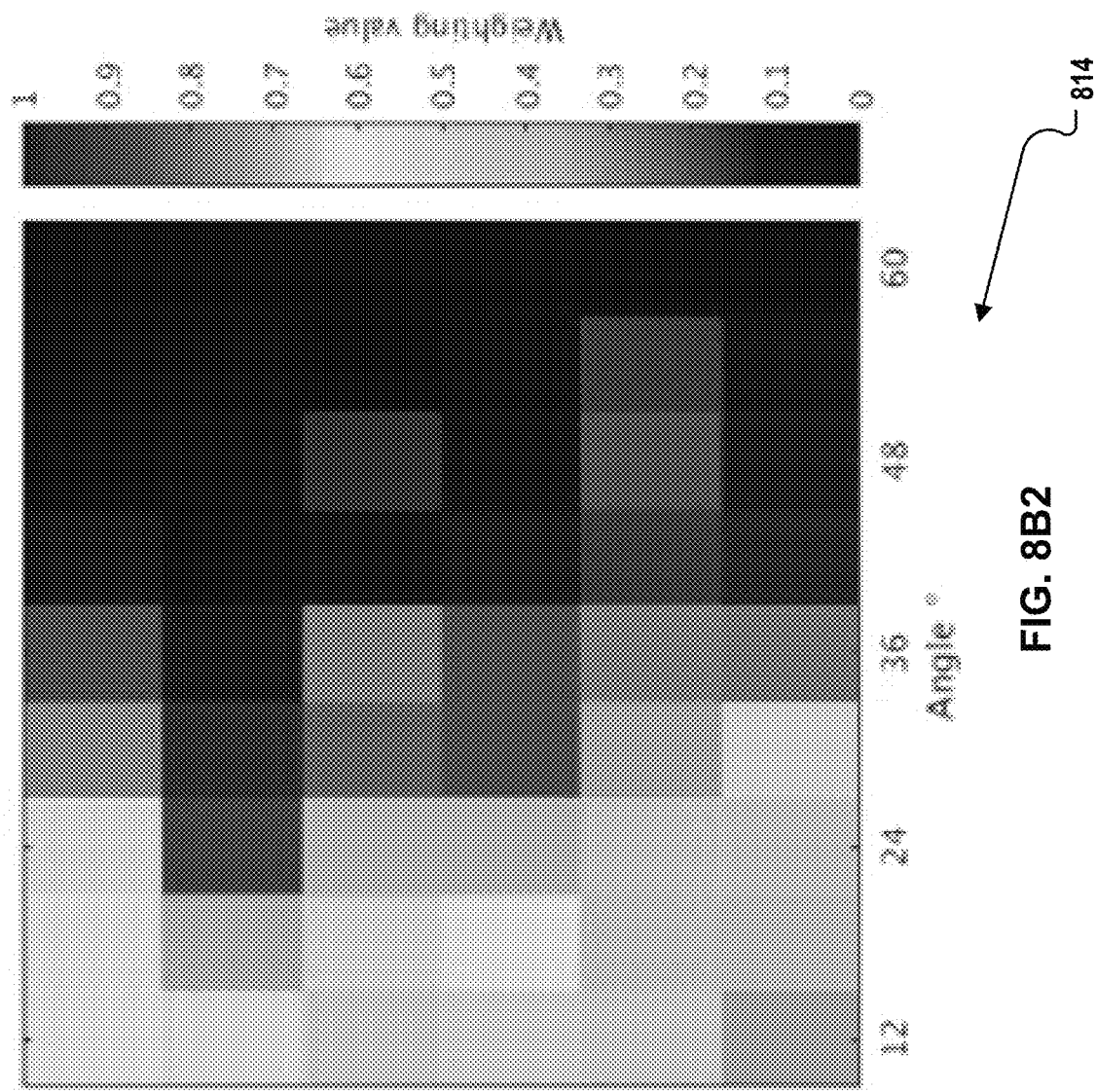
FIG. 8B2

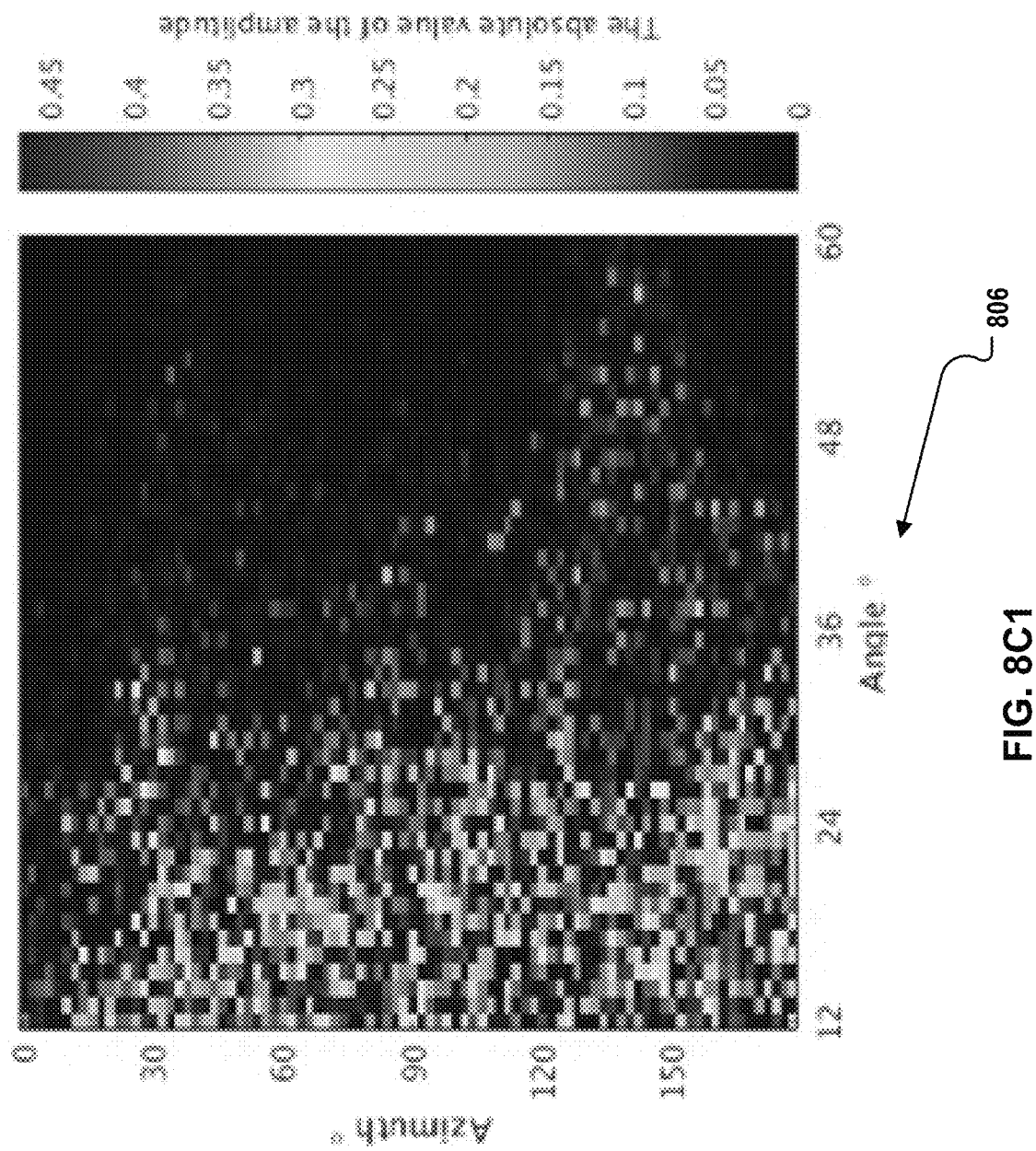
FIG. 8C1

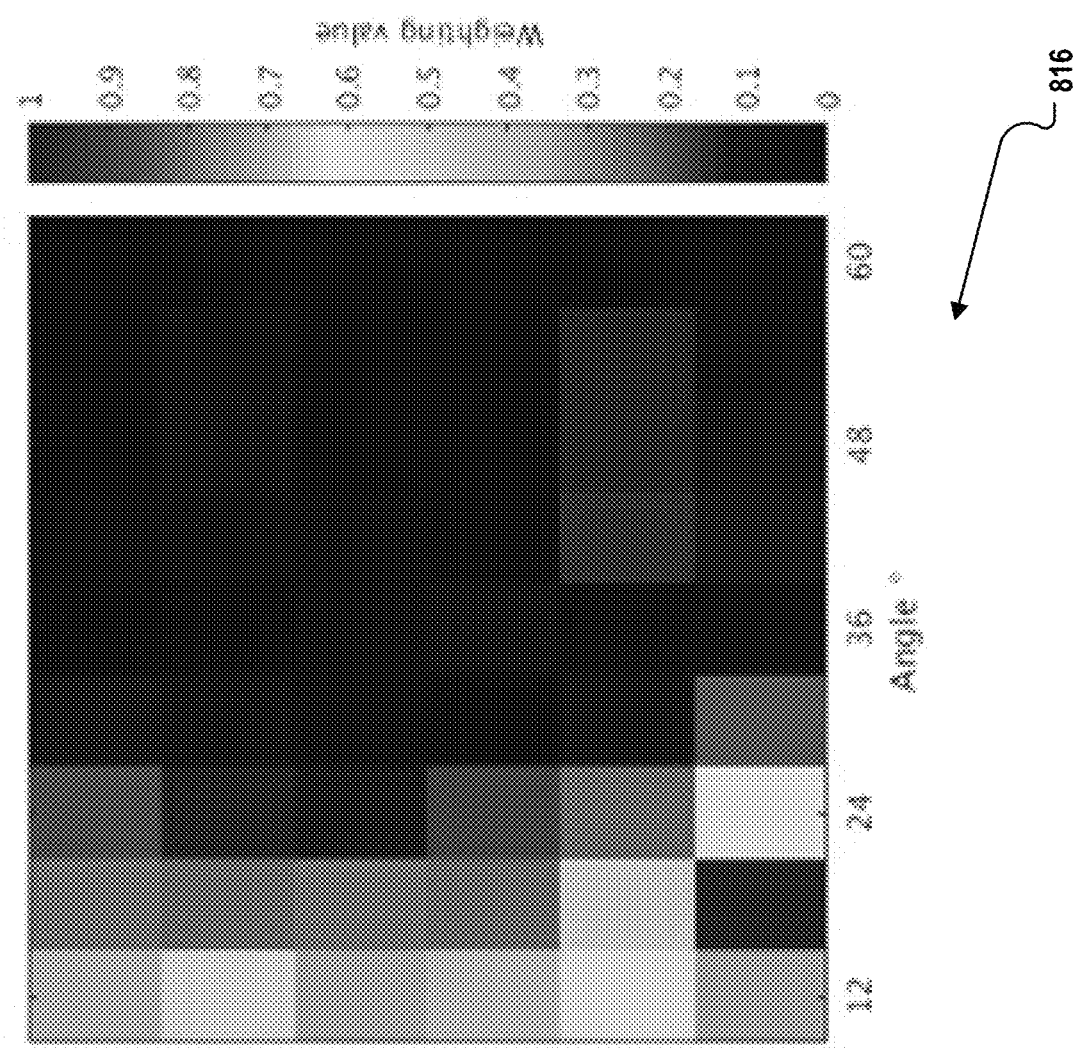
FIG. 8C2

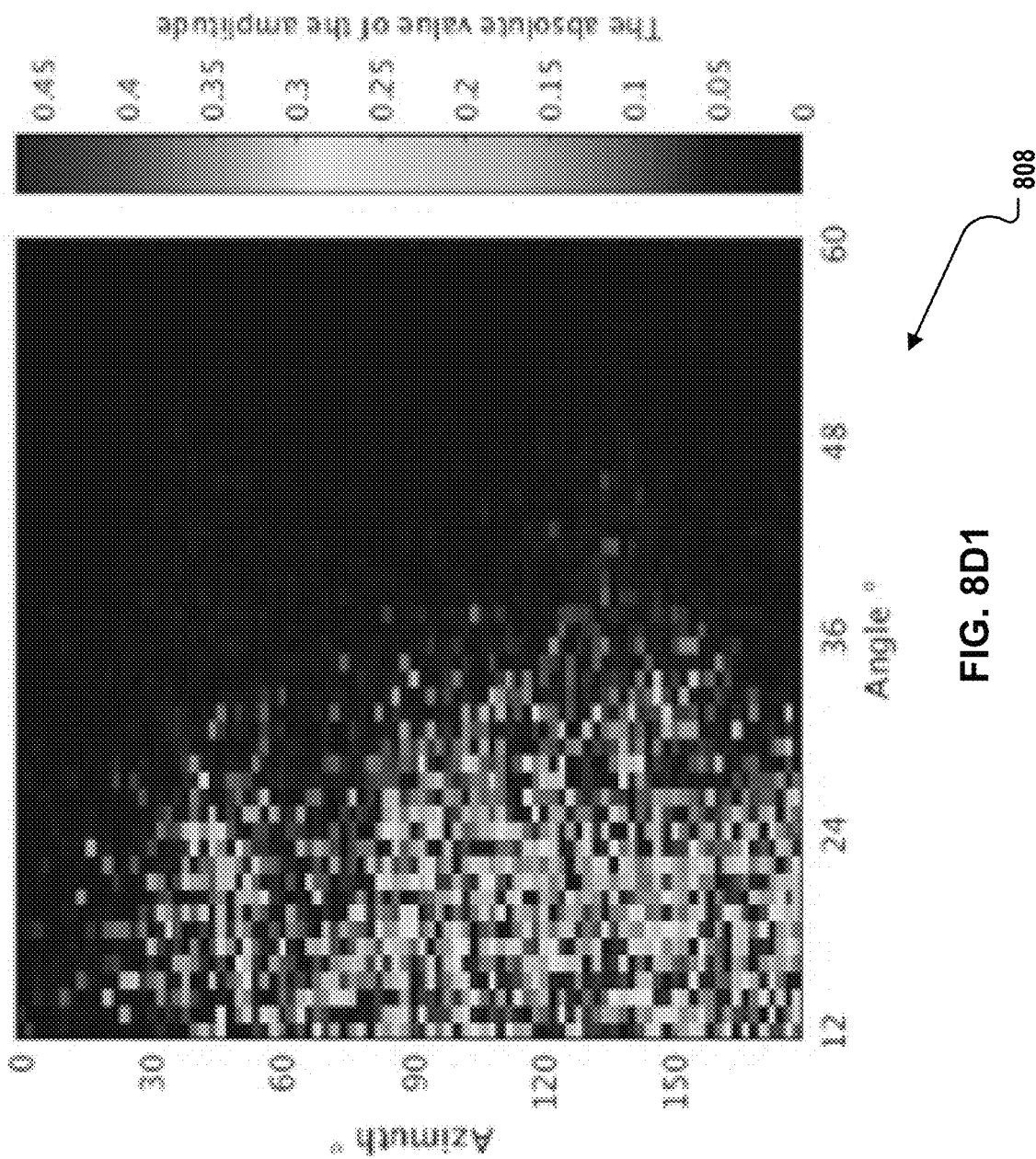
FIG. 8D1

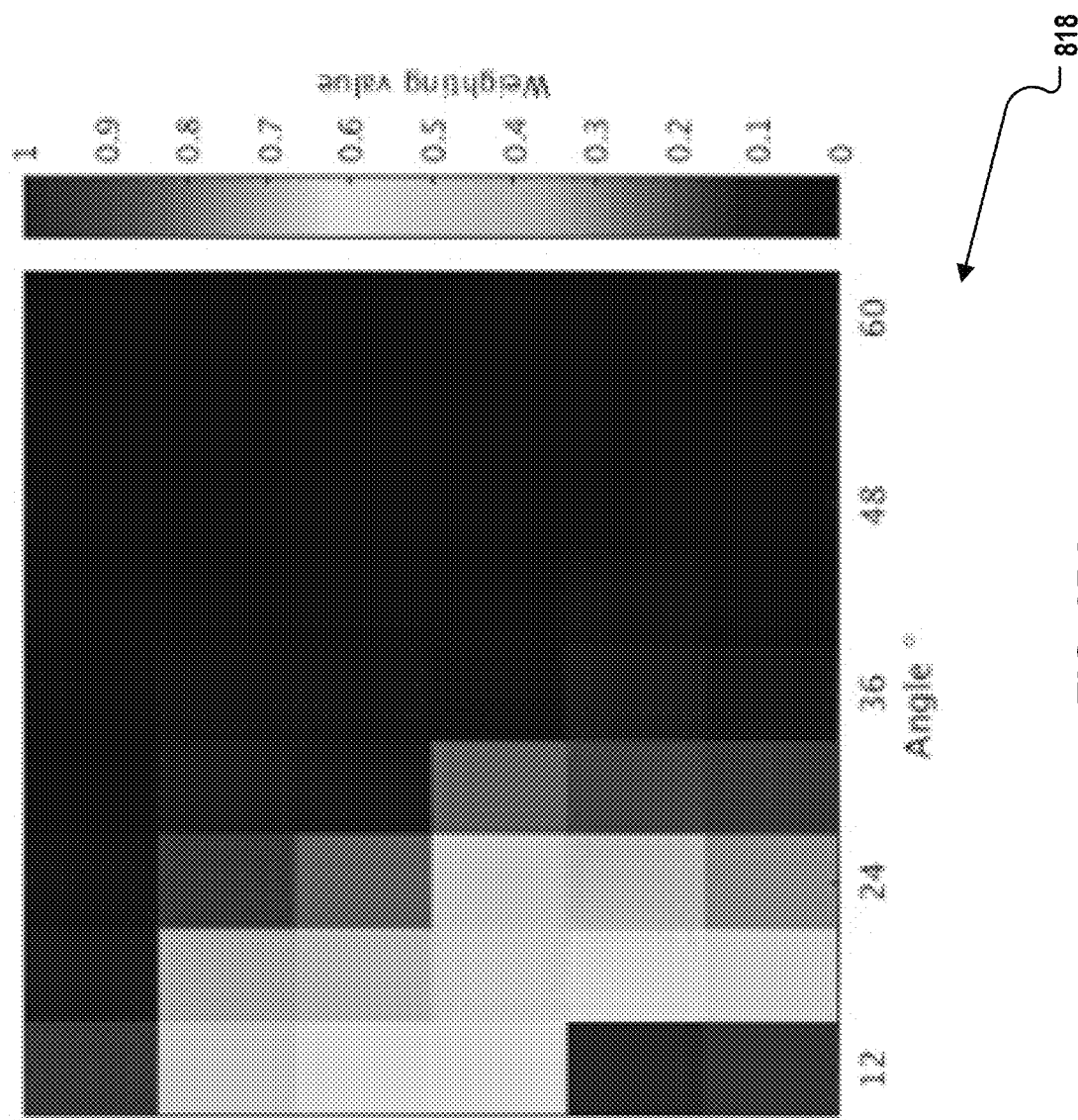
FIG. 8D2

GENERATING GEOPHYSICAL IMAGES USING DIRECTIONAL ORIENTED WAVEFIELD IMAGING

TECHNICAL FIELD

This disclosure relates to generating geophysical images for subsurface structures.

BACKGROUND

In a geophysics analysis, an image of the subsurface structure at a geographic area can be generated. In some cases, the image can also be referred as a profile of the subsurface structure. The image can be analyzed to detect the presence of hydrocarbon products in the area.

SUMMARY

The present disclosure describes methods and systems, including computer-implemented methods, computer program products, and computer systems for generating geophysical images. One computer-implemented method for generating geophysical images includes receiving, by a data processing apparatus, a set of seismic data associated with a subsurface region; generating, by the data processing apparatus, source analytic wavefields and receiver analytic wavefields based on the set of seismic data; decomposing the source analytic wavefields and receiver analytic wavefields based on down-going and up-going components of the source analytic wavefields and receiver analytic wavefields; computing, by the data processing apparatus, directions of propagations for the source analytic wavefields and receiver analytic wavefields based on the decomposed source analytic wavefields and receiver analytic wavefields; computing, for a plurality of subsurface points, an azimuth angle and a reflection angle for a respective subsurface point based on the directions of propagations; generating, by the data processing apparatus, for each of the plurality of subsurface points, a weighting function for a respective subsurface point based on the azimuth angle and the reflection angle of the respective subsurface point; and generating a subsurface image using the weighting functions of the plurality of subsurface points.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each, optionally, include one or more of the following features, alone or in combination:

A first aspect, combinable with the general implementation, wherein the source analytic wavefields and the receiver analytic wavefields are generated using Green's function.

A second aspect, combinable with any of the previous aspects, wherein the source analytic wavefields and receiver analytic wavefields are decomposed in their respective up-going and down-going wavefields based on the sign of the vertical wavenumber after they have been Fourier Transformed in the vertical direction.

A third aspect, combinable with any of the previous aspects, wherein the directions of propagations are computed using an optical flow method.

A fourth aspect, combinable with any of the previous aspects, wherein the reflection angle for a subsurface point is calculated according to $$\cos\theta = \frac{\vec{k}\cdot\vec{k}_r}{|\vec{k}||\vec{k}_r|},$$

and the azimuth angle for the a subsurface point is calculated according to $$\cos\varphi = \frac{(\vec{k}_s \times \vec{k}_r)\cdot(\vec{n}\times(\vec{k}_s + \vec{k}_r))}{|\vec{k}_s \times \vec{k}_r||\vec{n}\times(\vec{k}_s + \vec{k}_r)|},$$

where $\theta$ is the reflection angle, $\varphi$ is the azimuth angle, $\vec{n}$ is a unit vector indicating starting direction of the azimuth angle, $\vec{k}_s$ is a wavefield vector at a source location, and $\vec{k}_r$ is a wavefield vector at a receiver location.

A fifth aspect, combinable with any of the previous aspects, wherein the subsurface image is generated by stacking weighting functions for the plurality of subsurface points.

A sixth aspect, combinable with any of the previous aspects, wherein the set of seismic data comprise time-domain common shot gather.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

The patent or application file contains at least one drawing executed in color. Copies of this patent or patent application publication with color drawing(s) will be provided by the Patent and Trademark Office upon request and payment of the necessary fee.

FIGS. 5A1-5A2 illustrate example angle-domain common image gathers (ADCIGs), according to an implementation.

FIGS. 5B1-5B2 illustrate example weighting functions, according to an implementation.

FIG. 7 illustrates an extracted ADCIG, according to an implementation.

FIGS. 8A1-8A2, 8B1-8B2, 8C1-8C2, and 8D1-8D2 illustrate reflection angle and azimuth maps and the corresponding weighting function, according to an implementation.

Like reference numbers and designations in the various drawings indicate like elements.

DETAILED DESCRIPTION

Figure 1:
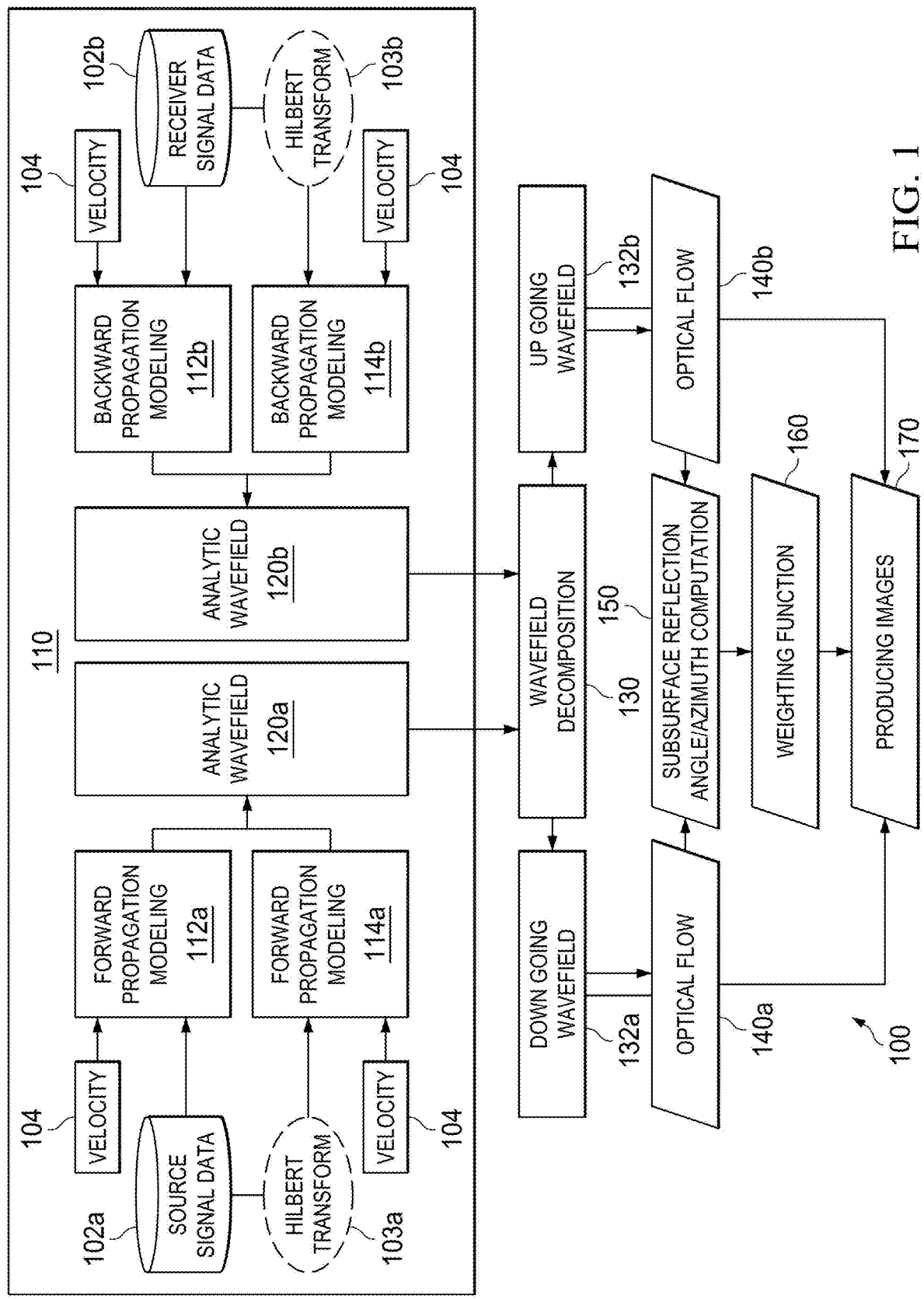
FIG. 1 illustrates an example imaging process using the directional oriented wavefield imaging (DOWFI) algorithm, according to an implementation.

The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes methods and systems, including computer-implemented methods, computer program products, and computer systems, for generating images for subsurface structure. In some cases, reverse-time migration (RTM) can be used for imaging in and below a subsurface structure having great structural and velocity complexities. In some cases, seismic signals can be transmitted into the subsurface of the earth at a source location by a source device. Examples of the seismic signals include acoustic signals. The seismic signals travel through the subsurface and can be received by a receiver device placed at a receiver location. In some cases, the source device, the receiver device, or a combination thereof can be placed at the surface. The signals can propagate downwards until they reach a reflecting structure and reflect upwards, towards the surface. Because the signals have refracted, reflected and transmitted through the substructure, the characteristics of the received signals contain information of the substructure. The received signals can be analyzed to produce images of the subsurface structure. In a marine survey, air guns and hydrophones can be used as the source devices and the receiver devices, respectively. During the acquisition, seismic sources are exploded from arrays of air guns while reflected and refracted signals are acquired to streamers of hydrophones. In a land acquisition, dynamite can be used an explosive source and a geophone is employed as a receiver device. In another example, vibratory trucks can be used as source devices. Other devices that generate and receive seismic signals can also be used. The RTM algorithm includes calculations of forward propagation of the source wavefield, the backward propagation of the receiver wavefield, and the associated imaging condition between the two computed wavefields. In some cases, source wavefield and receiver wavefield can be referred to as forward wavefield, deonated as $U_f$, and backward wavefield, denoted as $U_b$, respectively.

The scalar-wave equation in the time and space domain used in the calculation of forward propagation can be expressed as follows:

$$\frac{1}{c(x)^2} \frac{\partial^2 u_f(x, t; x_s)}{\partial t^2} = \nabla^2 u_f(x, t; x_s) + s(t; x_s)$$

Where $x_s$ is source locations, $c(x)$ is P-wave velocity, $s(t;x_s)$ is a source wavelet and $u_f(x,t;x_s)$ is a source wavefield (forward wavefield).

The receiver wavefield $u_b(x,t;x_s)$ propagates backward in time and can be calculated as follows:

$$\frac{1}{c(x)^2} \frac{\partial^2 u_b(x, t; x_s)}{\partial t^2} = \nabla^2 u_b(x, t; x_s) + d(x_r, t; x_s)$$

Where $d(x_r,t;x_s)$ is the acquired common-shot gather (input data) at receiver location $x_r$.

Because RTM uses two-way wave based operators, there may be adverse effects from low frequency artifacts when the source and the receiver wavefields are propagating in the same direction. These artifacts exhibit high amplitude noise which may significantly contaminate the migrated signal derived from the conventional cross-correlation imaging condition of the two wavefields. In addition, irregular acquisition geometry, multi-path wave propagation in complex velocity models, or a combination thereof may negatively affect the quality of the subsurface image. Both of these reasons can deteriorate depth seismic images and produce amplitude artifacts during depth imaging.

In some cases, a directional oriented wavefield imaging (DOWFI) algorithm can be used. In the DOWFI algorithm, a generalized RTM imaging condition can include a spatially variable wave based weighting function for each subsurface image point and surface location. The generalized imaging condition can compensate for irregular illumination in the image-space domain and accommodate the effects of complex wave propagation and field acquisition irregularities.

FIG. 1 illustrates an example imaging process 100 using the DOWFI algorithm according to an implementation. For clarity of presentation, the description that follows generally describes process 100 in the context of FIGS. 2-10B. However, it will be understood that process 100 may be performed, for example, by any other suitable system, environment, software, and hardware, or a combination of systems, environments, software, and hardware, as appropriate. In some cases, the process 100 can be executed on a large scale computer clusters, super computers, or any other computing device or collection of computing devices.

In some implementations, various steps of process 100 can be run in parallel, in combination, in loops, and/or in any order.

The DOWFI algorithm is a hierarchical imaging technique including the following aspects: (a) wave propagation modeling for forward and backward generating analytic wavefields, (b) source and receiver wavefield decomposition, (c) optical flow methodology is used to evaluate the direction of wavefield propagation, and (d) evaluation of a weighting function based on source and receiver wavefield illumination characteristics.

In some cases, during RTM the source down-going wavefield may be well behaved and does not suffer from noises. On the other hand, the up-going wavefield may suffer from back-scattering noise that can impact negatively the computation of the subsurface azimuth and reflection angles. Therefore, the source and receiver wavefields can be decomposed in down-going and up-going waves, respectively, so the optical flow algorithm can evaluate effectively the corresponding wavefield directions. Having obtained clean and robust wavefield directions the estimation of subsurface azimuth and reflection angles can be performed for each grid point and every imaging time.

At 110, analytic wavefields are generated based on source signal data 102a and receiver signal data 102b. The source signal data 102a includes sample data of the source signal that is transmitted into the subsurface of a geographic area by a source device. The receiver signal data 102b include sample data of the received signal obtained by a receiver device. In some cases, source signal data 102a are recordings of the source wavelets generated by the source device. Alternatively or in combination, source signal data 102 can be computer-generated source excitation using mathematical functions, for example, Ricker wavelet functions, or other simulations and approximations of the source signal.

The receiver signal data 102b includes time-domain common shot gather. In some cases, during seismic acquisition, a source (dynamite, vibratory truck, airgun array and etc.) is activated and the reflections/refractions/transmissions from the subsurface geological boundaries are recorded by the receiver devices which are located on the surface of the Earth. This type of acquisition is repeated for each shot, sequentially or simultaneously until all the seismic data have been acquired for this survey area. These acquired seismic data are included in the receiver signal data 102b. In some cases, the acquired seismic data are collected in the field, transferred to an office (stored and transported via a computer network, a physical network, or a combination thereof), and used as inputs to a computing device executing the process 100.

In a digital signal processing, an analytic signal is a complex-valued signal. The signal is composed with the original signal as the real part and its Hilbert transformed signal as its imaginary part, as shown in the equation below:

$$U_a(t,x,y,z) = U(t,x,y,z) + j\mathcal{H}[U(t,x,y,z)], \quad (1)$$

where $\mathcal{H}$ is the Hilbert transform, and the subscript a denotes analytic wavefield. j is the imaginary number.

As illustrated, the source signal data 102a and receiver signal data 102b are processed throughout the respective Hilbert transform functions, 103a and 103b, to generate their imaginary parts. Both the real part (the source signal data 102a and receiver signal data 102b) and the imaginary parts (after Hibert transformation) are processed using respective propagation modeling functions 112a, 112b, 114a, 114b to generate analytic wavefields 120a and 120b. Here, the forward propagation modeling functions 112a and 114a are used to process the real and imaginary parts of the source observed data 102a, while the b propagation modeling functions 112b and 114b are used to process the real and imaginary parts of the receiver observed data 102b.

As shown in FIG. 1, velocity 104, representing P-wave velocity under surface, are also used as input in the propagation modeling.

The wave equation used in 112a can be expressed as follows:

$$\frac{1}{c(x)^2} \frac{\partial^2 u_f(x,t;x_s)}{\partial t^2} - \nabla^2 u_f(x,t;x_s) = s(t;x_s)$$

Where $x_s$ is source locations, c(x) is the P-wave velocity (104), $s(t;x_s)$ is the source signal data (102a) and $u_f(x,t;x_s)$ is the source wavefield. The wave equation used in 114a can be expressed as follows:

$$\frac{1}{c(x)^2} \frac{\partial^2 \mathcal{H}[u_f(x,t;x_s)]}{\partial t^2} - \nabla^2 \mathcal{H}[u_f(x,t;x_s)] = \mathcal{H}[s(t;x_s)]$$

Where c(x) is P-wave velocity (104), $\mathcal{H}[s(t;x_s)]$ is a Hilbert transformed source signal data (103a) and $\mathcal{H}[u_f(x,t;x_s)]$ is a Hilbert transformed source wavefield.

The wave equation used in 112b can be expressed as follows:

$$\frac{1}{c(x)^2} \frac{\partial^2 u_b(x,t;x_s)}{\partial t^2} - \nabla^2 u_b(x,t;x_s) = d(x_r,t;x_s)$$

Where c(x) is P-wave velocity (104) and $d(x_r,t;x_s)$ represents receiver signal data (102b).

The wave equation used in 114b can be expressed as follows:

$$\frac{1}{c(x)^2} \frac{\partial^2 \mathcal{H}[u_b(x,t;x_s)]}{\partial t^2} - \nabla^2 \mathcal{H}[u_b(x,t;x_s)] = \mathcal{H}[d(t;x_s)]$$

Where c(x) is P-wave velocity (104), $\mathcal{H}[d(t;x_s)]$ is a Hilbert transformed receiver signal data and $\mathcal{H}[u_b(x,t;x_s)]$ is a Hilbert transformed receiver wavefield.

Because the positive frequency component is considered in the analytic wavefield, equation (1) can be separated to up-going and down-going wavefields more easily with the Fourier transform along the z dimension, as shown in the equation below:

$$\tilde{U}_a(t,x,y,k_z) = \begin{cases} U_+(t,x,y,k_z), & k_z \geq 0 \\ U_-(t,x,y,k_z), & k_z < 0 \end{cases}, \quad (2)$$

where the subscripts "+" and "−" denote down and up going wavefields, respectively. This approach may introduce substantial overhead, due to the fact that the Hilbert transform uses a Fourier transform with its shifting phase component at ±90°.

For an efficient application of equations (1) and (2) in an RTM algorithm, the analytic wavefield can be constructed by taking advantage of the intrinsic characteristic of the Hilbert transform, as shown in the equation below:

$$\mathcal{H}(u*v) = \mathcal{H}(u)*v = u*z,46(v). \quad (3)$$

In some cases, Green's function can be used in the forward and background propagation modeling. When the forward and backward propagated wavefields are computed, each wavefield can be described by:

$$U_f(t,x,y,z)=G*s(t,x,y,z) \qquad (4)$$

and $$U_b(t,x,y,z)=G*d(t,x,y,z), \qquad (5)$$

where the subscripts f and b denote forward and backward propagation, respectively, and G denotes the Green's function. s represents the source signal data 102a and d represents the receiver signal data 102b.

By equation (3), the Hilbert transform of equations (4) and (5) are equivalent to the convolution of the Hilbert transformed source function or recorded data with the Green's function as follows:

$$\mathcal{H}[U_f(t,x,y,z)]=G*\mathcal{H}[s(t,x,y,z)] \qquad (6)$$

and $$\mathcal{H}[U_b(t,x,y,z)]=G*\mathcal{H}[d(t,x,y,z)]. \qquad (7)$$

Therefore, the source analytic wavefields 120a and receiver analytic wavefields 120b are obtained using equations (1), (6), and (7).

At 130, the analytic wavefields 120a and 120b are decomposed. As described previously, the analytic wavefields 120a and 120b can be obtained by equations (1), (6), and (7), and thus the separation into up-going and down-going components can be computed in a more efficient way, using equation (2). The down-going source and up-going receiver wavefields are separated from the original wavefields in order to perform RTM cross-correlation based imaging. In the illustrated example, the analytic wavefields 120a and 120b are decomposed into source down-going wavefields 132a and receiver up-going wavefields 132b for each time step, respectively.

At 140a and 140b, the wave propagation directions and their associated vectors for the wavefields 132a and 132b are calculated using optical flow. In some cases, optical flow can be used in motion estimation technology to provide instantaneous vectors for each wave motion. Using the wave motion vector for each wavefield, the azimuth and angle components at each depth image point for each time step can be computed.

The optical flow method is defined by finding the motion vector $\vec{M}(u,v,w)$ which denotes the instantaneous propagation direction of the wave. The optical flow equation is written as:

$$D_x u + D_y v + D_z w + D_t = 0 \qquad (8)$$

$$\text{Where } D_i = \frac{\partial U}{\partial i} \ (i \in \{x, y, z, t\}). \qquad (9)$$

The Horn and Schunck (HS) algorithm can be used to solve equation (8), which has three unknowns and one equation. The HS algorithm assumes similar motions in neighboring points and constraint for large spatial gradient. The HS algorithm minimizes the objective function below:

$$C = \int\int_\Omega [(D_x u + D_y v + D_z w + D_t)^2 + \lambda^2(\|\nabla u\|^2 + \|\nabla v\|^2 + \|\nabla w\|^2)]dxdydz, \qquad (10)$$

$$\text{Where } \|\nabla\|^2 = \sum_i \left(\frac{\partial}{\partial i}\right)^2 \ (i \in \{x, y, z\}), \qquad (11)$$

and $\lambda$, is a factor that weighs the term in the second parenthesis on the right-hand side, which is a smoothness constraint. The minimization of equation (10) gives the optical flow solution following the HS algorithm as follows:

$$u^{n+1} = \bar{u}^n + \frac{D_x(D_x\bar{u}^n + D_y\bar{v}^n + D_z\bar{w}^n + D_t)}{\lambda^2 + (D_x)^2 + (D_y)^2(D_z)^2} \qquad (12)$$

$$v^{n+1} = \bar{v}^n + \frac{D_y(D_x\bar{u}^n + D_y\bar{v}^n + D_z\bar{w}^n + D_t)}{\lambda^2 + (D_x)^2 + (D_y)^2(D_z)^2} \qquad (13)$$

$$w^{n+1} = \bar{w}^n + \frac{D_z(D_x\bar{u}^n + D_y\bar{v}^n + D_z\bar{w}^n + D_t)}{\lambda^2 + (D_x)^2 + (D_y)^2(D_z)^2} \qquad (14)$$

where, overbar indicates the local average as derived from the Laplacians. Applying this iterative HS solution to the forward and backward wavefields produces the instantaneous wave motion vector at each image grid point and every imaging time.

At 150, the subsurface azimuth and reflection angles are computed based on the wave propagation directions and their associated vectors according to the following formulation:

$$\text{For reflection angle: } \cos\theta = \frac{\vec{k}\cdot\vec{k}_r}{|\vec{k}||\vec{k}_r|}, \qquad (15)$$

$$\text{For azimuth angle: } \cos\varphi = \frac{(\vec{k}_s\times\vec{k}_r)\cdot(\vec{n}\times(\vec{k}_s+\vec{k}_r))}{|\vec{k}_s\times\vec{k}_r||\vec{n}\times(\vec{k}_s+\vec{k}_r)|} \qquad (16)$$

where $\theta$ is the reflection angle, $\varphi$ is the subsurface azimuth angle, $\vec{n}$ is the unit vector indicating the starting direction of the subsurface azimuth angle, $\vec{k}$ is wavefield vector expressed as (u,v,w), and subscripts s and r denote source and receiver locations, respectively.

At 160, the weighting function is constructed using the azimuth and reflection angles. In some cases, the RTM imaging condition is constructed using the zero-lag cross-correlation of the forward and backward wavefields. In these cases, the RTM imaging condition is written as:

$$I_{conv}(\vec{x})=\int_0^{T_{max}}U_f(\vec{x},t)U_b(\vec{x},T_{max}-t)dt, \qquad (17)$$

Where $I_{conv}$ is the image at a spatial point of $\vec{x}$, U is the wavefield which is defined by the subscripts f for forward and b for backward propagation, respectively.

Alternatively, in the DOWFI algorithm, the illumination energy can be incorporated as a weighting function at each depth image point with respect to specific subsurface azimuth and reflection angles. Hence, in the DOWFI imaging condition, in addition to a function of space and time, wavefields are a function of space, time, azimuth, and reflection angles, as shown in the follow equation:

$$I_{DOWFI}(\vec{x})=\int_0^\pi\int_0^{\pi/2}W(\vec{x},\theta,\varphi)I(\vec{x},\theta,\varphi)d\theta d\varphi, \qquad (18)$$

where
$$I(x,\theta,\varphi)=\int_0^{T_{max}}U_f^+(\vec{x},t,\theta,\varphi)$$
$$U_b^-(\vec{x},T_{max}-t,\theta,\varphi)dt \qquad (19)$$

W is the weighting function, and $\theta$ and $\varphi$ are subsurface reflection and azimuth angles, respectively. The superscripts "+" and "−" indicate down-going and up-going wavefields, respectively.

At 170, the wavefield illumination compensated subsurface image are produced by applying the weighting function described previously. After obtaining the azimuth reflection angle domain common image gathered by RTM according to equation (19), the final wavefield illumination compensated subsurface image can be obtained by stacking over the azimuth and reflection angle axes of each Angle Domain Common Image Gather (ADCIG) incorporating the weighting function W according to equation (18). In some cases, the produced images can be outputted on a user interface for analysis. Alternatively or in combination, the produced images can be transmitted over a network to one or more locations for storing, analyzing, further processing, or any combinations thereof. The produced images can represent depth images (geological horizons) of the subsurface. Based on these depth images geological assessments can be made on whether there is a potential trap, structure, or a combination thereof for hydrocarbon accumulation. Moreover, these depth sections can be used as a guide for drilling engineers to optimally place and locate their well trajectories to the prospective hydrocarbon reservoir.

Figure 2:
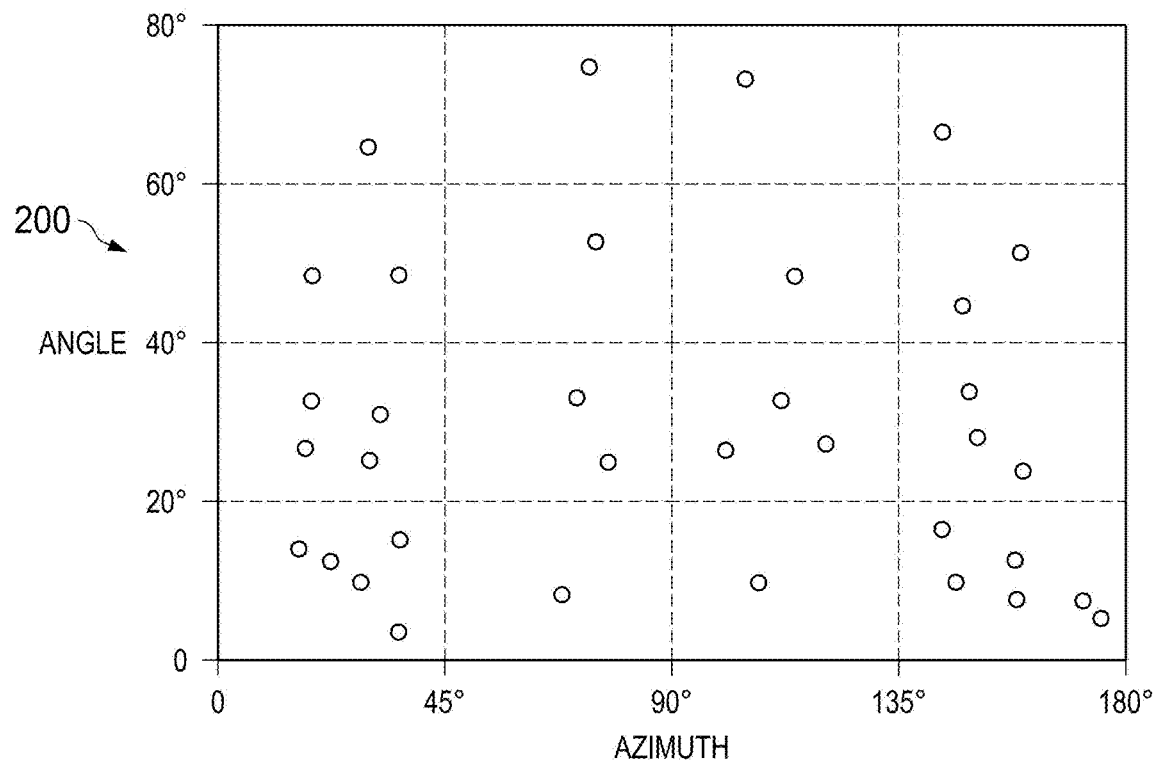
FIG. 2 is an example azimuth and reflection angle map, according to an implementation.

FIG. 2 is an example azimuth and reflection angle map 200, according to an implementation. As discussed previously, in order to compensate for the unequal illumination due to complex subsurface wave paths, irregular acquisition geometries, or a combination thereof, a weighting function can be applied during the RTM imaging. In the three dimential (3D) case, the weighting function used in DOWFI is constructed based on the azimuth and reflection angle maps for each depth point and for each surface location. An azimuth and reflection angle map includes a collection of azimuth and reflection angles that represent the contribution of the specific depth image point to the azimuth—angle domain common image gathers. In order to capture the illumination distribution of each depth point, a uniform rectangular grid is used. Each section of the grid represents its contribution along azimuth and reflection angles.

The map 200 illustrates a 4×4 bin sector of the weighting function for a specific subsurface depth point, at a specific surface location. The dots indicate illumination contribution along azimuth (horizontal axis) and reflection angles (vertical axis). Each dot represents the contribution of one sample imagine point to the azimuth—reflection angle gather. After conducting the illumination analysis for each depth point and surface location, the corresponding weighting function used during the RTM imaging process, for example at equation 18, can be evaluated.

The weighting function can be applied based on the subsurface azimuth and reflection angles as a normalized illumination function $W_{NRM}$ in according to the following equation:

$$W_{NRM}(x, \theta, \varphi) = W(x, \theta, \varphi) \Big/ \max_{\Omega_g \in \Omega} W(x, \theta, \varphi), \quad (20)$$

where $$W(x, \theta, \varphi) = \iint_{\Omega_g} |I(x, \theta, \varphi)| d\Omega_g, \text{ if } \theta, \varphi \in \Omega_g \quad (21)$$

where W is a weighting function in an angle-azimuth bin domain $\Omega_g$, I is AADCIG obtained from the decomposed down-going source and up-going receiver wavefields, respectively, x is the spatial coordinate, $\theta$ and $\varphi$ are subsurface reflection and azimuth angles, respectively, and $\Omega$ denotes the total angle-azimuth domain in a certain spatial coordinate.

As discussed previously in equation 18, the DOWFI algorithm generates an imaging condition using the wavefield decomposition method based on analytic wavefields and a weighting function based on the wavefield energy as a function of subsurface azimuth-reflection angle distribution, as shown in the equation below:

$$I_{DOWFI}(x) = \int_0^\pi \int_0^{\pi/2} W(x, \theta, \varphi) d\theta d\varphi. \quad (21)$$

Therefore, the final image can be obtained by integrating over azimuth and reflection angle axes of the azimuth reflection angle domain common image gathers. These images are free from low frequency artifacts and are compensated from possible field acquisition irregularities and complex wave phenomena in a variable velocity depth model, as shown in FIGS. 4A-10B. Images with higher resolution and less artifacts provide a better view of subsurface structure, and therefore improve the accuracy of analysis and predictions of hydrocarbon presence in a field.

Figure 4A:
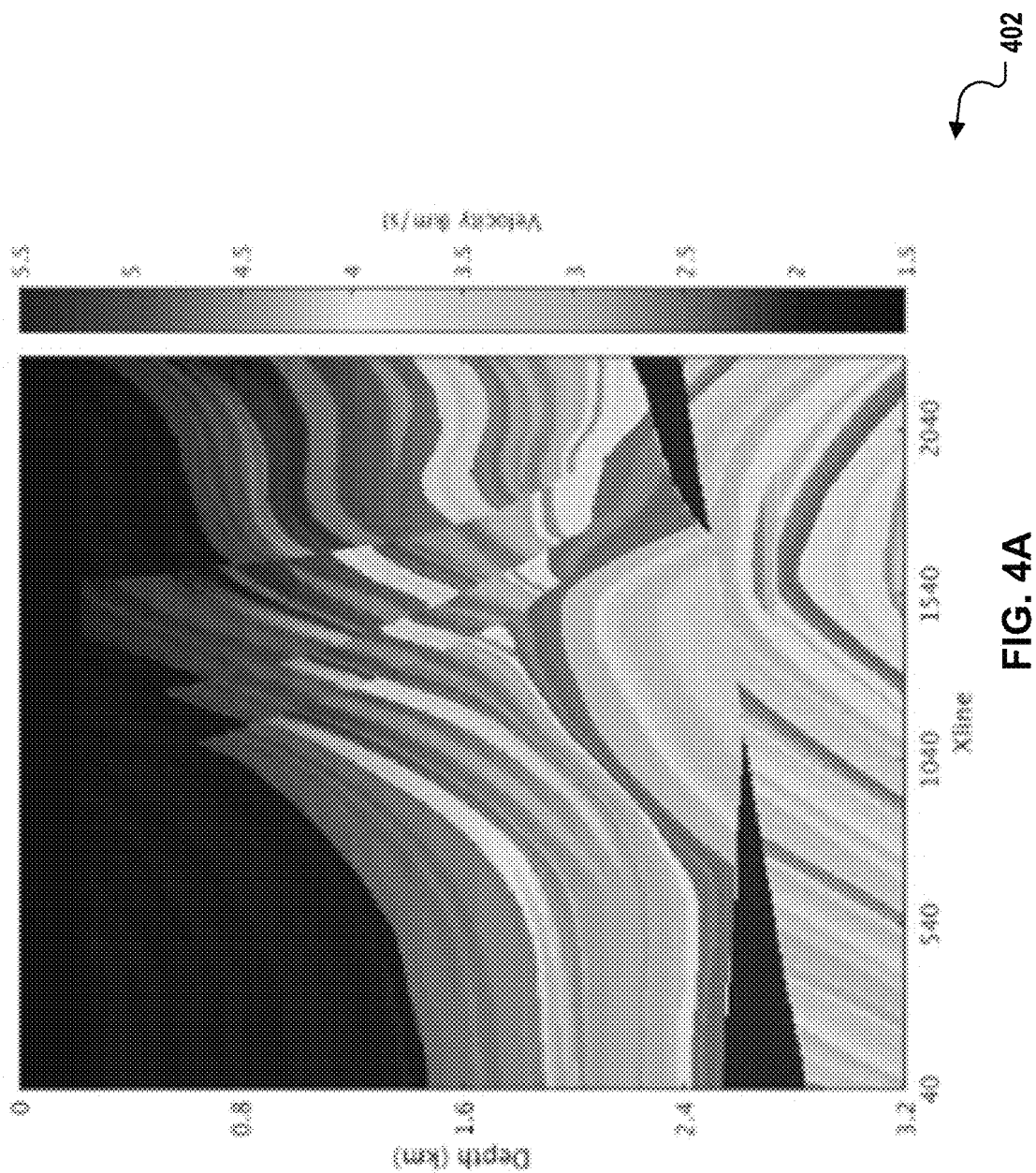
FIGS. 4A-4B illustrate example velocity models, according to an implementation.
Figure 4B:
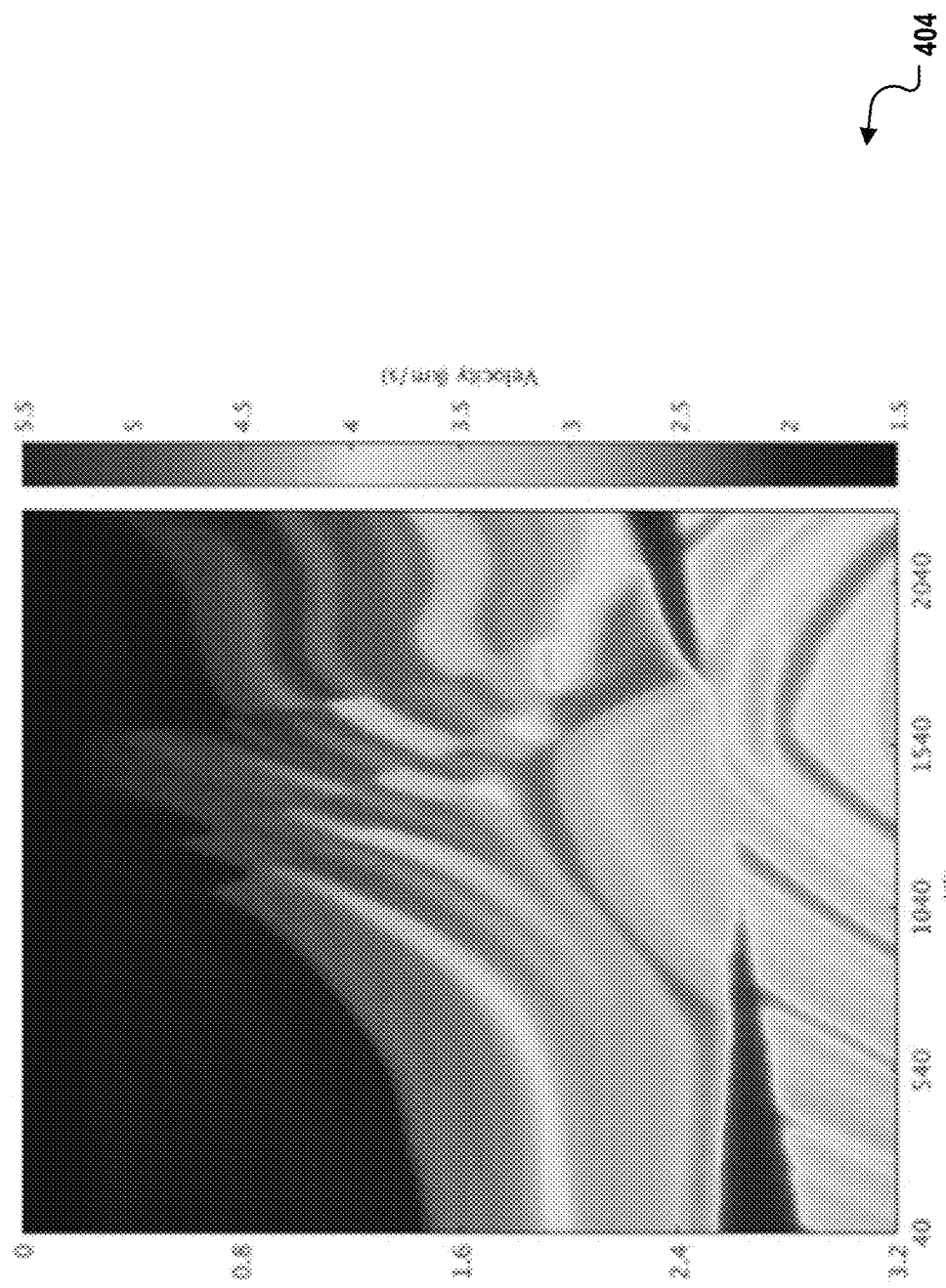

FIGS. 4A and 4B illustrate example velocity models 402 and 404, according to an implementation. In this case, RTM using DOWFI was applied on 2D synthetic Marmousi model. The velocity model 402 represents a modified Marmousi model prior to smoothing. The velocity model 402 which was generated by adding a water layer of 200 m on the top of the original model. Here, xline number is used instead of kilometer as the horizontal axis and the interval of xlines was 4 m. The velocity model 404 represents a smoothed version of the Marmousi model. The velocity model 404 is used for the migration background velocity model and the RTM is performed with grids of 4 m in all directions. A Ricker wavelet is used as a source wavelet with the peak frequency of 20 Hz.

FIGS. 5A1 and 5A2 illustrates example angle-domain common image gathers (ADCIGs) 502, 504, 506, and 508 at locations of xlines 540, 1040, 1540, and 2040 according to an implementation. The number of iterations for calculating wavefield vector directions using the optical flow application is 20 and the interval of angles is 1°. In this example, the ADCIG at each xline is divided into 13 angle groups from 5° to 65°, with intervals of 5°. Weighting functions at every depth location and xline is calculated using equation 20. Seismic events located in 0~5° are excluded in the calculation of DOWFI because of the singularity problem in the amplitude-preserving RTM. FIGS. 5B1 and 5B2 illustrates the corresponding weighting functions 512, 514, 516, and 518 at 4 depth locations (0.6, 1.2, 1.8, and 2.4 km) of xlines 540, 1040, 1540, and 2040, according to an implementation. Generally, weighting values decrease as the reflection angle increases for each depth location, while weighting functions at 600 m depth of xlines 1540 and 2040 show different trends compared to those at other depths and xlines.

Figure 6A:
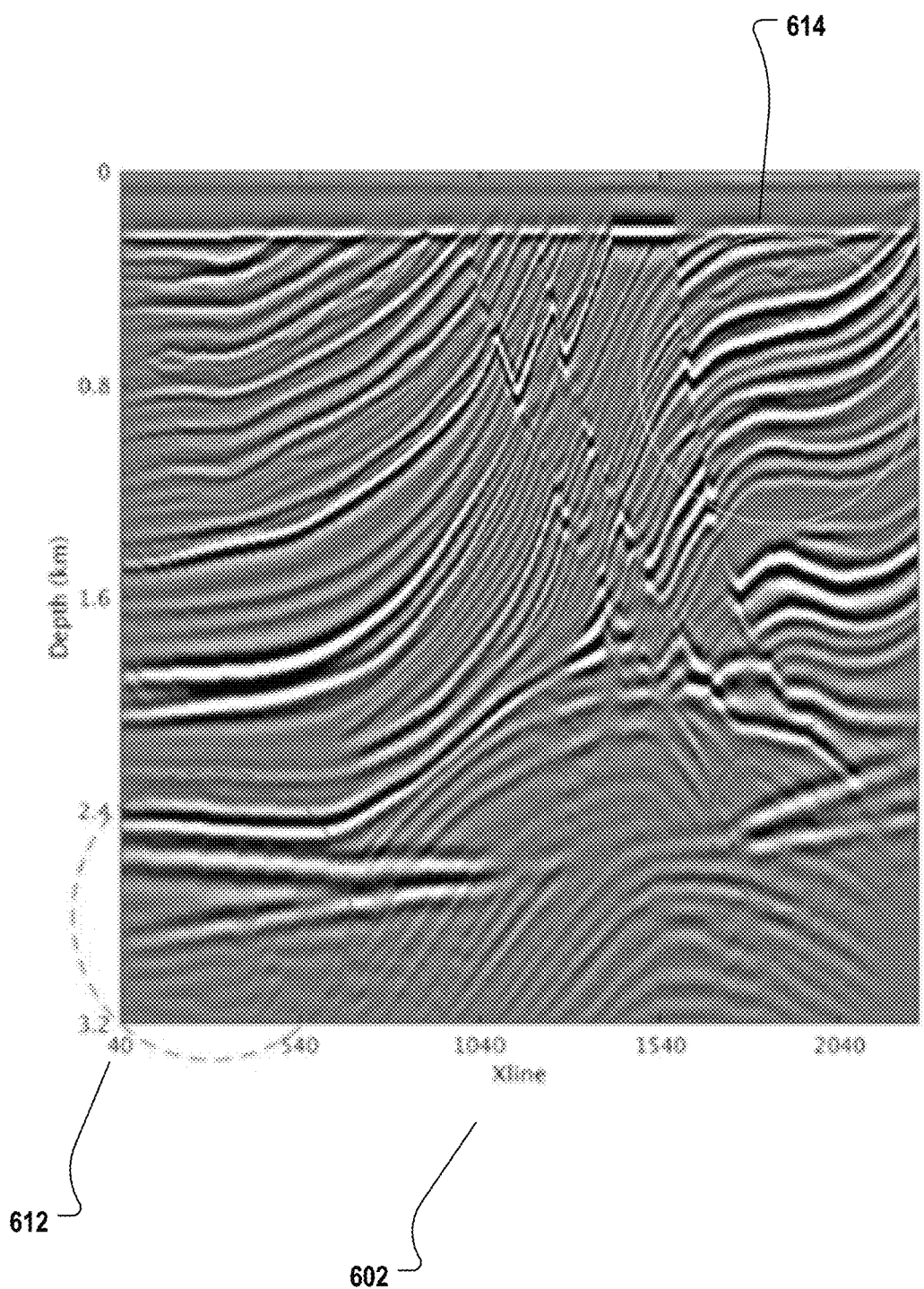
FIGS. 6A-6B illustrate an example comparison of images, according to an implementation.
Figure 6B:
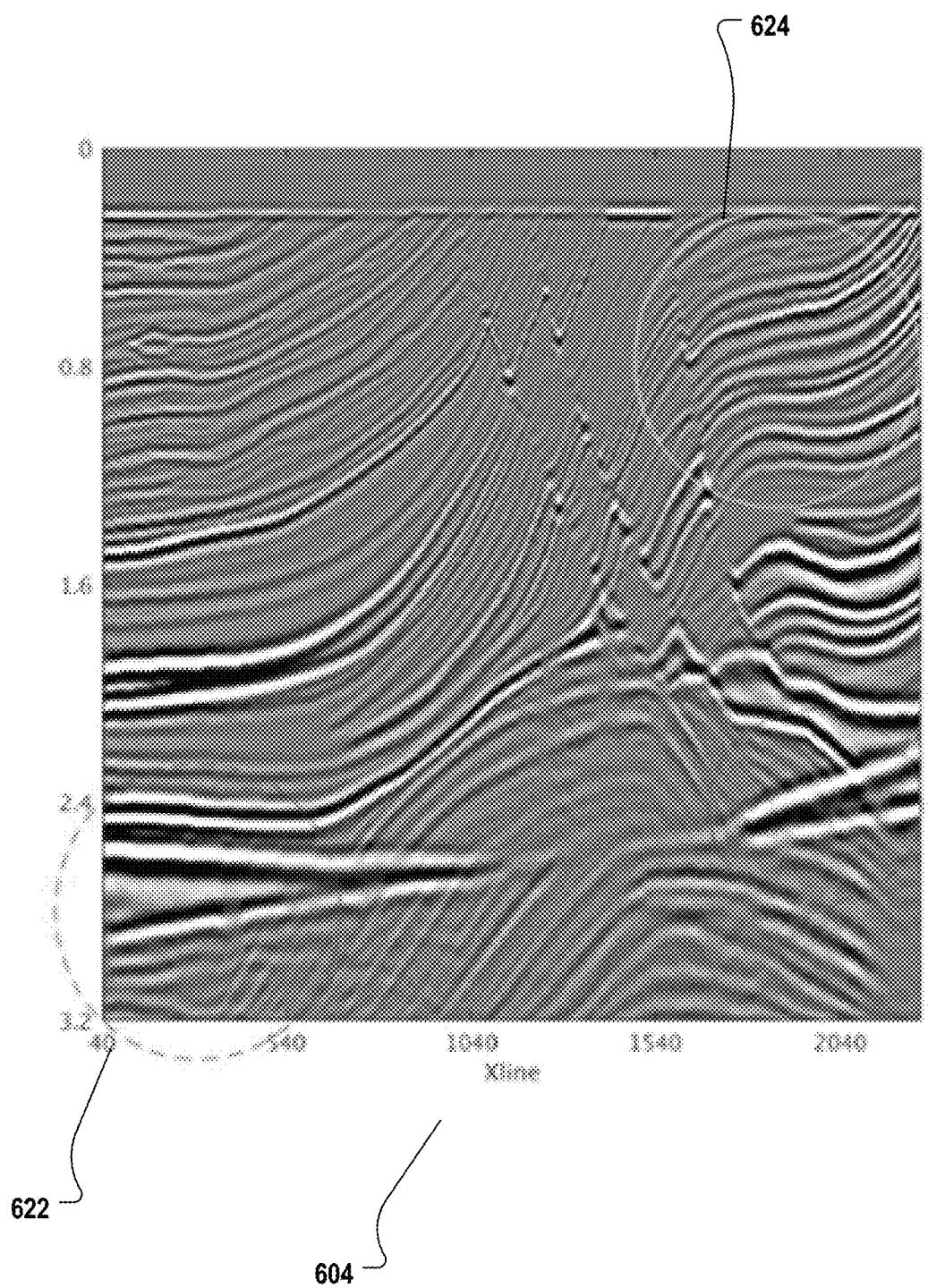

FIGS. 6A-6B illustrate an example comparison of images, according to an implementation. FIGS. 6A-6B include an RTM image 602 obtained by the conventional correlation imaging condition and an RTM image 604 obtained using DOWFI. Low frequency artifacts generated during the application of the conventional RTM are suppressed by applying a low-cut filter in the depth direction to the migration image. As illustrated, seismic structures 622 and 624 are shown with significantly higher resolution and less low frequency artifacts in image 604, comparing to the seismic structures 612 and 614, shown in the image 602. Moreover, DOWFI does not suffer from low frequency artifacts because only seismic events generated by the source down-going and the receiver up-going wavefields are included in the final migrated image.

In one example, DOWFI is applied with RTM on the 3D seismic land data acquired from a seismic subsurface to be analyzed. The grid sizes for the RTM are 25 m, 25 m, and 15 m in X, Y, and Z directions, respectively. A Ricker source wavelet whose peak frequency is 25 Hz is used. The 2nd-order in time and 8th-order in space domain finite difference stencil is used for the numerical modeling and the perfect matching layer boundary condition is applied to absorb unwanted reflected waves from the model boundaries.

FIG. 7 illustrates an extracted ADCIG, according to an implementation. FIG. 7 includes image 702, which shows a sample ADCIG extracted from 2.9 km of the left edge of the migrated section. FIG. 7 also includes image 704, which shows the surface location where the sample is extracted. The displayed ADCIG was obtained by stacking the AADCIG on the surface location along the azimuth angles. As illustrated, 4 points denoted by A, B, C, and D represent examples of corresponding weighting functions. FIGS. 8A1-8A2, 8B1-8B2, 8C1-8C2, and 8D1-8D2 illustrate reflection angle and azimuth maps and the corresponding weighting function for these locations, according to an implementation. Images 802, 804, 806, and 808 illustrate the obtained reflection angle and azimuth maps for locations A, B, C, and D, respectively. For example, the reflection angle-azimuth map at location A is obtained by extracting the absolute value of $I(x,\theta,\varphi)$. Weighting functions are calculated by partitioning the reflection angle—azimuth map into 9 groups of angles (12°~60° with intervals of 6°) and 6 groups of azimuths (0°~180° with intervals of 30°). Images 812, 814, 816, and 818 illustrate the weighting tiles for locations A, B, C, and D. In this example, the subsurface azimuth angle is calculated from the inline direction. Therefore, the crossline was laid on 90° azimuth angle as the perpendicular direction of the inline axis. As illustrated, relatively high weighting values are usually located adjacent to inline directions and exhibit relatively small values for large reflection angles, for example, angles greater than 36°.

Figure 9A:
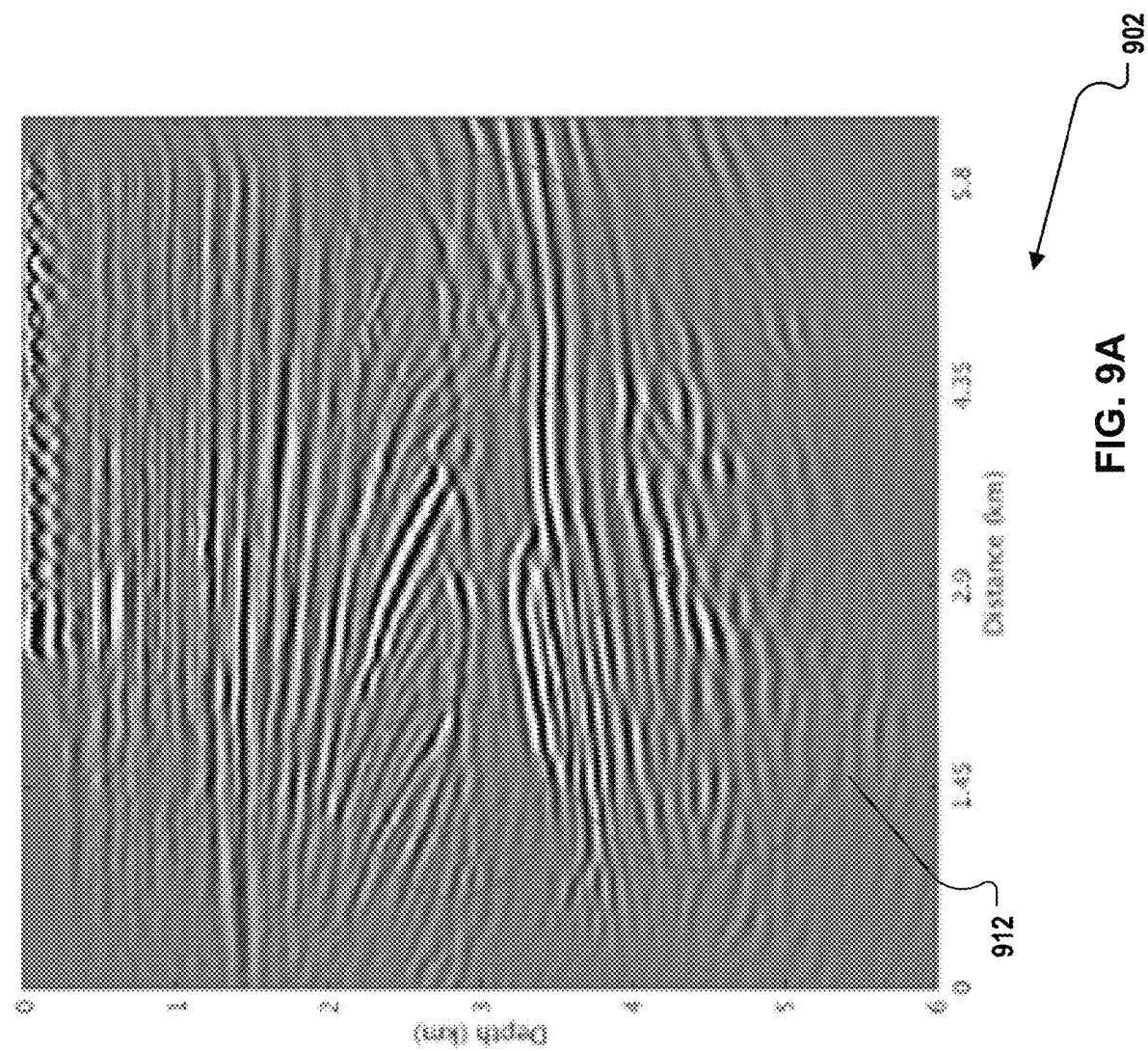
FIGS. 9A-9B illustrate a comparison for the migration results obtained on an inline, according to an implementation.
Figure 9B:
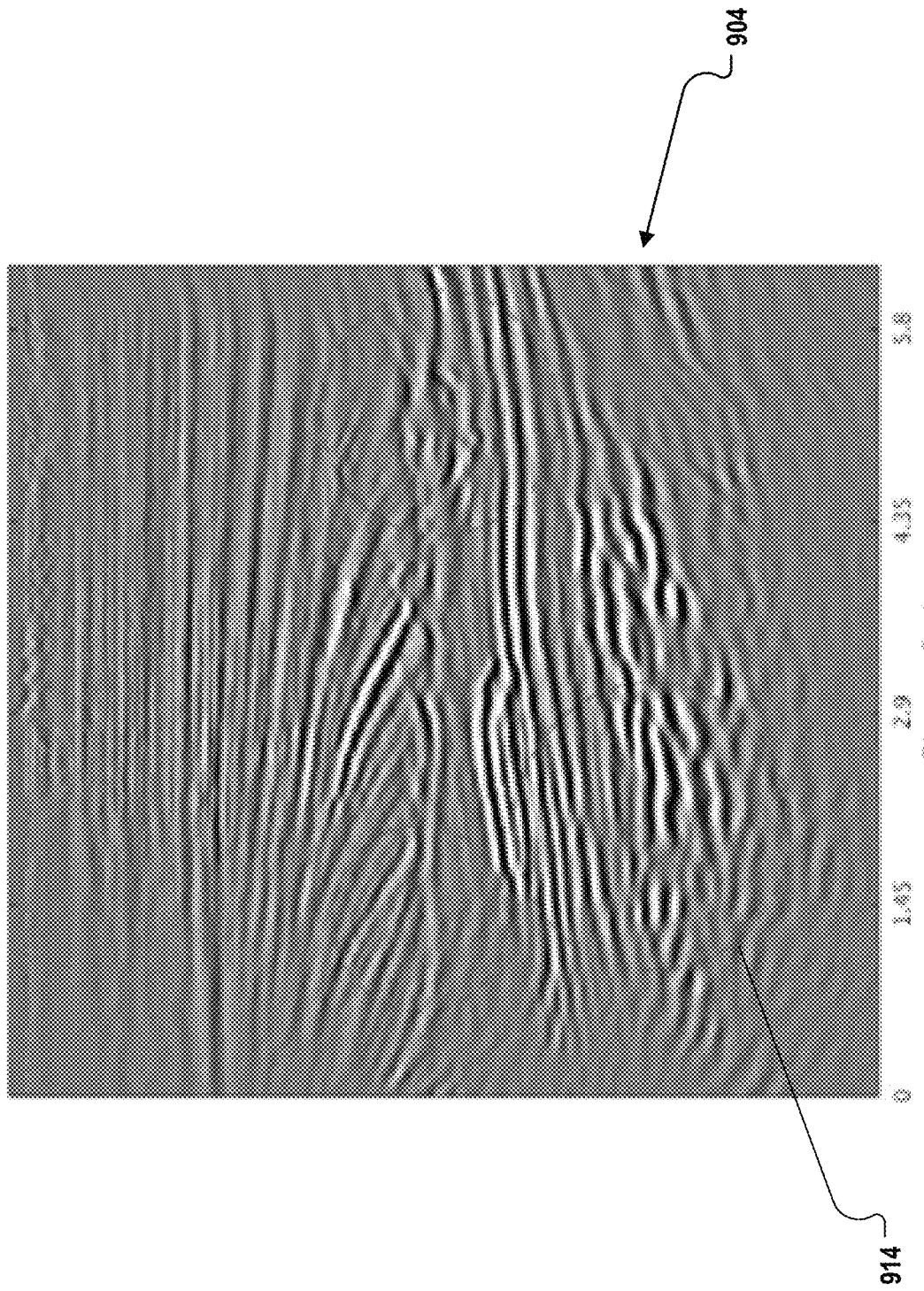

RTM images obtained by applying the conventional imaging condition and DOWFI can be compared. Here, a low-cut filter in depth direction is applied to the conventionally RTM images to suppress low frequency artifacts. FIGS. 9A-9B illustrate a comparison for the migration results obtained on an inline, according to an implementation. FIGS. 9A-9B include image 902, which is generated using the conventional imaging condition, and image 904, which is generated using DOWFI. As illustrated, the circled areas in image 904, for example the area 914, are delineated more clearly than the circled areas in image 904, for example the area 912. The image 904 shows higher fidelity and resolution, especially in the deeper part compared to conventionally imaged RTM section, shown in the image 902.

Figure 10A:
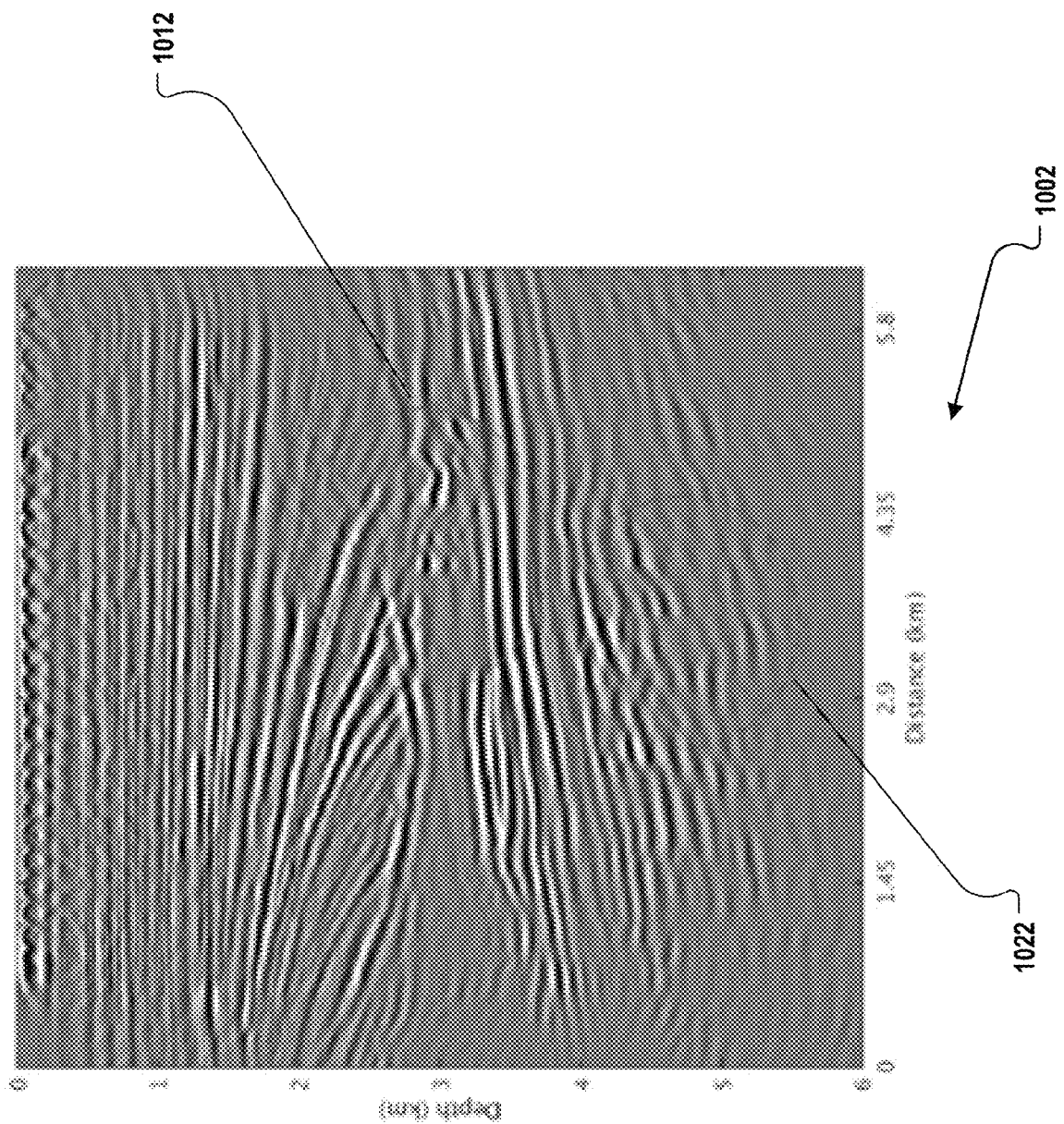
FIGS. 10A-10B illustrate a comparison for the migration results obtained on another inline, according to an implementation.
Figure 10B:
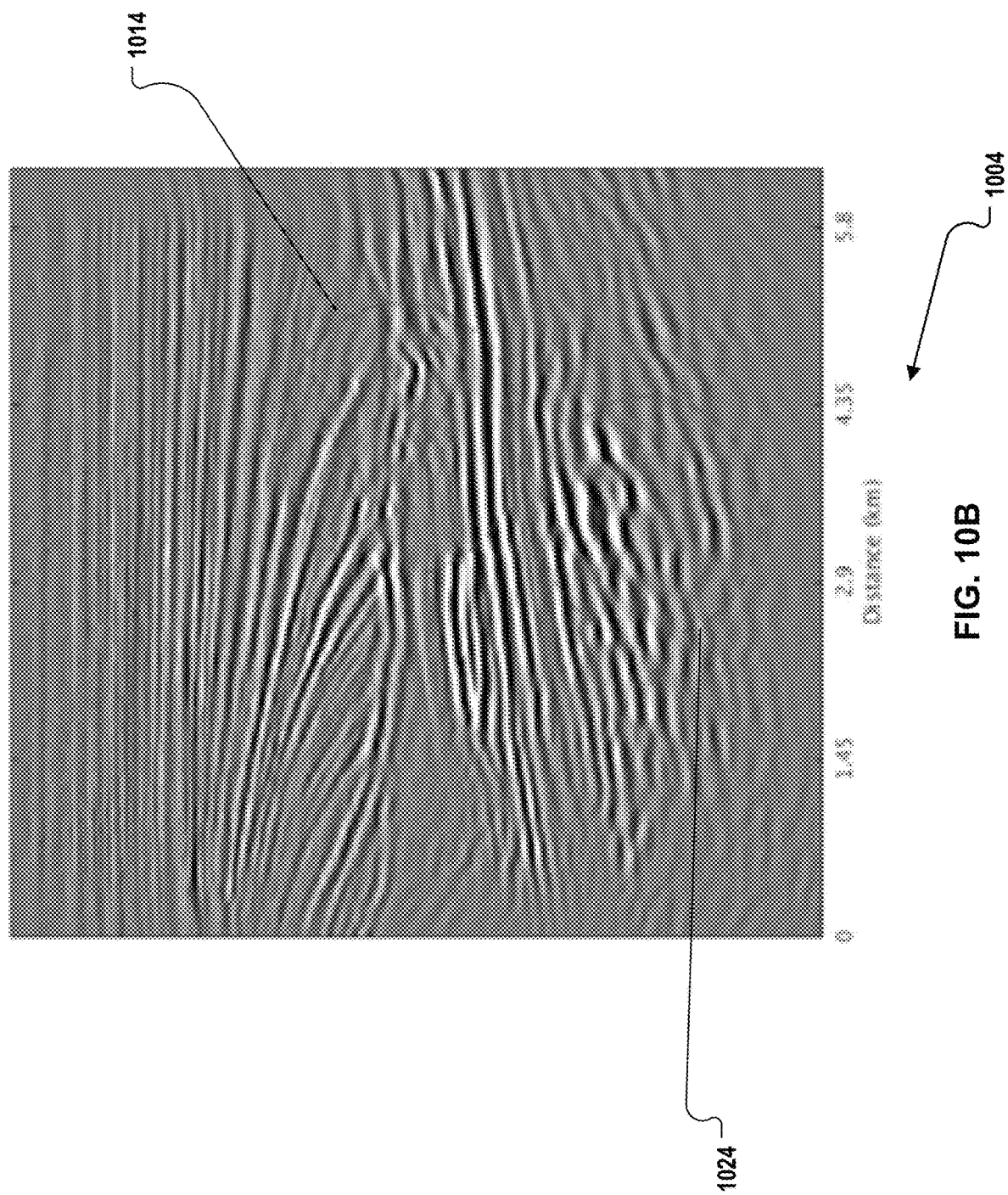

FIGS. 10A-10B illustrate a comparison for the migration results obtained on another inline, according to an implementation. FIGS. 10A-10B include image 1002, which is generated using the conventional imaging condition, and image 1004, which is generated using DOWFI. The top boundary of the salt indicated by the upper circle 1014 shown in the image 1004 is better delineated and exhibits stronger continuity than the boundary indicated by the circle 1012 shown in the image 1002. In addition, as indicated by lower circles 1022 and 1024, the image 1004 shows more uniform reflections than the image 1002 because of the weighting function based illumination during the DOWFI based RTM imaging.

Figure 3:
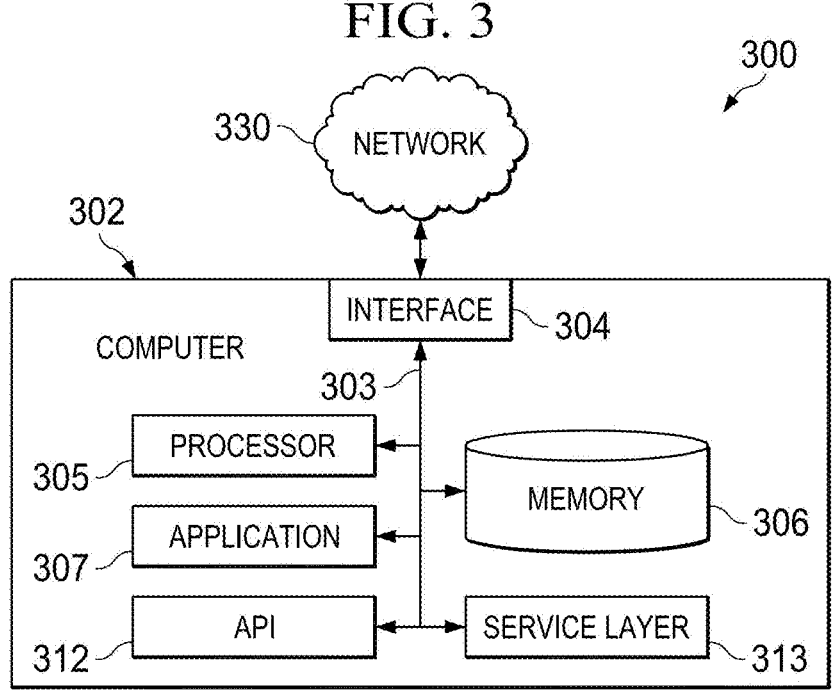
FIG. 3 is a high level architecture block diagram of a geophysical imaging system, according to an implementation.

FIG. 3 is a high level architecture block diagram of a geophysical imaging system 300, according to an implementation. At a high level, the illustrated system 300 includes a geophysical image processing computer 302 coupled with a network 330. The described illustration is only one possible implementation of the described subject matter and is not intended to limit the disclosure to the single described implementation. Those of ordinary skill in the art will appreciate the fact that the described components can be connected, combined, and/or used in alternative ways, consistent with this disclosure.

The network 330 facilitates communication between the computer 302 and other components, for example, components that obtain observed data for a location and transmit the observed data to the computer 302. The network 330 can be a wireless or a wireline network. The network 330 can also be a memory pipe, a hardware connection, or any internal or external communication paths between the components.

The computer 302 includes a computing system configured to perform the DOWFI as described previously. In some cases, the algorithm of the DOWFI can be implemented in an executable computing code, e.g., C/C++ executable codes. In some cases, the computer 302 can include a standalone Linux system that runs batch applications. In some cases, the computer 302 can include mobile or personal computers that have sufficient memory size to process each block of the geophysical data.

The computer 302 may comprise a computer that includes an input device, such as a keypad, keyboard, touch screen, microphone, speech recognition device, other devices that can accept user information, and/or an output device that conveys information associated with the operation of the computer 302, including digital data, visual and/or audio information, or a GUI.

The computer 302 can serve as a client, network component, a server, a database, or other persistency, and/or any other component of the system 300. In some implementations, one or more components of the computer 302 may be configured to operate within a cloud-computing-based environment.

At a high level, the computer 302 is an electronic computing device operable to receive, transmit, process, store, or manage data and information associated with the system 300. According to some implementations, the computer 302 may also include, or be communicably coupled with, an application server, e-mail server, web server, caching server, streaming data server, business intelligence (BI) server, and/or other server.

The computer 302 can receive requests over network 330 from a client application (e.g., executing on another computer 302) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304, over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302 and/or the system 300. The functionality of the computer 302 may be accessible for all service consumers using this service layer. Software services, such as those provided by the service layer 313, provide reusable, defined business functionalities, through a defined interface. For example, the interface may be software written in JAVA, C++, or other suitable language providing data in Extensible Markup Language (XML) format or other suitable format. While illustrated as an integrated component of the computer 302, alternative implementations may illustrate the API 312 and/or the service layer 313 as stand-alone components in relation to other components of the computer 302 and/or system 300. Moreover, any or all parts of the API 312 and/or the service layer 313 may be implemented as child or sub-modules of another software module, enterprise application, or hardware module, without departing from the scope of this disclosure.

The computer 302 includes an interface 304. Although illustrated as a single interface 304 in FIG. 3, two or more interfaces 304 may be used according to particular needs, desires, or particular implementations of the computer 302 and/or system 300. The interface 304 is used by the computer 302 for communicating with other systems in a distributed environment—including within the system 300—connected to the network 330 (whether illustrated or not). Generally, the interface 304 comprises logic encoded in software and/or hardware in a suitable combination and operable to communicate with the network 330. More specifically, the interface 304 may comprise software supporting one or more communication protocols associated with communications such that the network 330 or interface's hardware is operable to communicate physical signals within and outside of the illustrated system 300.

The computer 302 includes a processor 305. Although illustrated as a single processor 305 in FIG. 3, two or more processors may be used according to particular needs, desires, or particular implementations of the computer 302 and/or the system 300. Generally, the processor 305 executes instructions and manipulates data to perform the operations of the computer 302. Specifically, the processor 305 executes the functionality required for processing geophysical data.

The computer 302 also includes a memory 306 that holds data for the computer 302 and/or other components of the system 300. Although illustrated as a single memory 306 in FIG. 3, two or more memories may be used according to particular needs, desires, or particular implementations of the computer 302 and/or the system 300. While memory 306 is illustrated as an integral component of the computer 302, in alternative implementations, memory 306 can be external to the computer 302 and/or the system 300.

The application 307 is an algorithmic software engine providing functionality according to particular needs, desires, or particular implementations of the computer 302 and/or the system 300, particularly with respect to functionality required for processing geophysical data. For example, application 307 can serve as one or more components/applications described in FIGS. 1-2 and 4A-10B. Further, although illustrated as a single application 307, the application 307 may be implemented as multiple applications 307, on the computer 302. In addition, although illustrated as integral to the computer 302, in alternative implementations, the application 307 can be external to the computer 302 and/or the system 300.

There may be any number of computers 302 associated with, or external to, the system 300 and communicating over network 330. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A method for generating subsurface images, comprising:
  receiving, by a data processing apparatus, a set of seismic data associated with a subsurface region;
  generating, by the data processing apparatus, source analytic wavefields and receiver analytic wavefields based on the set of seismic data;
  decomposing the source analytic wavefields and receiver analytic wavefields based on down-going and up-going components of the source analytic wavefields and receiver analytic wavefields;
  computing, by the data processing apparatus, directions of propagations for the source analytic wavefields and receiver analytic wavefields based on the decomposed source analytic wavefields and receiver analytic wavefields, wherein the directions of propagations are computed using an optical flow method;
  computing, by the data processing apparatus, for a plurality of subsurface points, an azimuth angle and a reflection angle for a respective subsurface point based on the directions of propagations, wherein the reflection angle for the respective subsurface point is calculated according to $$\cos\theta = \frac{\vec{k}\cdot\vec{k}_r}{|\vec{k}||\vec{k}_r|},$$

and the azimuth angle for the respective subsurface point is calculated according to $$\cos\varphi = \frac{(\vec{k}_s\times\vec{k}_r)\cdot(\vec{n}\times(\vec{k}_s+\vec{k}_r))}{|\vec{k}_s\times\vec{k}_r||\vec{n}\times(\vec{k}_s+\vec{k}_r)|},$$

where $\theta$ is the reflection angle, $\varphi$ is the azimuth angle, $\vec{n}$ is a unit vector indicating starting direction of the azimuth angle, $\vec{k}$ is a wavefield vector, $\vec{k}_s$ is a wavefield vector at a source location, and $\vec{k}_r$ is a wavefield vector at a receiver location;
  generating, for each of the plurality of subsurface points, a weighting function for the respective subsurface point by using the azimuth angle and the reflection angle of the respective subsurface point, wherein each weighting function represents illumination energy at the respective subsurface point according to the azimuth angle and the reflection angle of the respective subsurface point; and
  generating a subsurface image using the weighting functions of the plurality of subsurface points that are constructed using the azimuth angles and the reflection angles of the respective subsurface points.

2. The method of claim 1, wherein the source analytic wavefields and the receiver analytic wavefields are generated using Green's function.

3. The method of claim 1, wherein the source analytic wavefields and receiver analytic wavefields are decomposed based on a product of Green's function and a Hilbert transform of the set of seismic data.

4. The method of claim 1, wherein the subsurface image is generated by stacking weighting functions for the plurality of subsurface points.

5. The method of claim 1, wherein the set of seismic data comprise time-domain common shot gather.

6. A non-transitory computer-readable medium storing instructions which, when executed, cause a computing device to perform operations comprising:
  receiving, by a data processing apparatus, a set of seismic data associated with a subsurface region;
  generating, by the data processing apparatus, source analytic wavefields and receiver analytic wavefields based on the set of seismic data;

decomposing the source analytic wavefields and receiver analytic wavefields based on down-going and up-going components of the source analytic wavefields and receiver analytic wavefields;

computing, by the data processing apparatus, directions of propagations for the source analytic wavefields and receiver analytic wavefields based on the decomposed source analytic wavefields and receiver analytic wavefields, wherein the directions of propagations are computed using an optical flow method;

computing, by the data processing apparatus, for a plurality of subsurface points, an azimuth angle and a reflection angle for a respective subsurface point based on the directions of propagations, wherein the reflection angle for the respective subsurface point is calculated according to $$\cos\theta = \frac{\vec{k}\cdot\vec{k}_r}{|\vec{k}||\vec{k}_r|},$$

and the azimuth angle for the respective subsurface point is calculated according to $$\cos\varphi = \frac{(\vec{k}_s\times\vec{k}_r)\cdot(\vec{n}\times(\vec{k}_s+\vec{k}_r))}{|\vec{k}_s\times\vec{k}_r||\vec{n}\times(\vec{k}_s+\vec{k}_r)|},$$

where $\theta$ is the reflection angle, $\varphi$ is the azimuth angle, $\vec{n}$ is a unit vector indicating starting direction of the azimuth angle, $\vec{k}$ is a wavefield vector, $\vec{k}_s$ is a wavefield vector at a source location, and $\vec{k}_r$ is a wavefield vector at a receiver location;

generating, for each of the plurality of subsurface points, a weighting function for the respective subsurface point by using the azimuth angle and the reflection angle of the respective subsurface point, wherein each weighting function represents illumination energy at the respective subsurface point according to the azimuth angle and the reflection angle of the respective subsurface point; and generating a subsurface image using the weighting functions of the plurality of subsurface points that are constructed using the azimuth angles and the reflection angles of the respective subsurface points.

7. The non-transitory computer-readable medium of claim 6, wherein the source analytic wavefields and the receiver analytic wavefields are generated using Green's function.

8. The non-transitory computer-readable medium of claim 6, wherein the source analytic wavefields and receiver analytic wavefields are decomposed based on a product of Green's function and a Hilbert transform of the set of seismic data.

9. The non-transitory computer-readable medium of claim 6, wherein the subsurface image is generated by stacking weighting functions for the plurality of subsurface points.

10. The non-transitory computer-readable medium of claim 6, wherein the set of seismic data comprise time-domain common shot gather.

11. A device, comprising:
at least one hardware processor;
a non-transitory computer-readable storage medium coupled to the at least one hardware processor and storing programming instructions for execution by the at least one hardware processor, wherein the programming instructions instruct the at least one hardware processor to:

receive, by the at least one hardware processor, a set of seismic data associated with a subsurface region;

generate, by the at least one hardware processor, source analytic wavefields and receiver analytic wavefields based on the set of seismic data;

decompose the source analytic wavefields and receiver analytic wavefields based on down-going and up-going components of the source analytic wavefields and receiver analytic wavefields;

compute, by the at least one hardware processor, directions of propagations for the source analytic wavefields and receiver analytic wavefields based on the decomposed source analytic wavefields and receiver analytic wavefields, wherein the directions of propagations are computed using an optical flow method;

compute, by the at least one hardware processor, for a plurality of subsurface points, an azimuth angle and a reflection angle for a respective subsurface point based on the directions of propagations, wherein the reflection angle for the respective subsurface point is calculated according to $$\cos\theta = \frac{\vec{k}\cdot\vec{k}_r}{|\vec{k}||\vec{k}_r|},$$

and the azimuth angle for the respective subsurface point is calculated according to $$\cos\varphi = \frac{(\vec{k}_s\times\vec{k}_r)\cdot(\vec{n}\times(\vec{k}_s+\vec{k}_r))}{|\vec{k}_s\times\vec{k}_r||\vec{n}\times(\vec{k}_s+\vec{k}_r)|},$$

where $\theta$ is the reflection angle, $\varphi$ is the azimuth angle, $\vec{n}$ is a unit vector indicating starting direction of the azimuth angle, $\vec{k}$ is a wavefield vector, $\vec{k}_s$ is a wavefield vector at a source location, and $\vec{k}_r$ is a wavefield vector at a receiver location;

generate, for each of the plurality of subsurface points, a weighting function for the respective subsurface point by using the azimuth angle and the reflection angle of the respective subsurface point, wherein each weighting function represents illumination energy at the respective subsurface point according to the azimuth angle and the reflection angle of the respective subsurface point; and generate a subsurface image using the weighting functions of the plurality of subsurface points that are constructed using the azimuth angles and the reflection angles of the respective subsurface points.

12. The device of claim 11, wherein the source analytic wavefields and the receiver analytic wavefields are generated using Green's function.

13. The device of claim 11, wherein the source analytic wavefields and receiver analytic wavefields are decomposed based on a product of Green's function and a Hilbert transform of the set of seismic data.

14. The device of claim 11, wherein the subsurface image is generated by stacking weighting functions for the plurality of subsurface points.

\* \* \* \* \*